US012560792B2

(12) United States Patent
Ozawa et al.

(10) Patent No.: US 12,560,792 B2
(45) Date of Patent: Feb. 24, 2026

(54) POLARIZED MICROSCOPE AND INTRA IMAGE FIELD CORRECTION ANALYSIS METHOD

(71) Applicant: Samsung Electronics Co., Ltd., Suwon-si (KR)

(72) Inventors: Ken Ozawa, Yokohama (JP); Shinji Ueyama, Yokohama (JP); Tomoki Onishi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 18/175,452

(22) Filed: Feb. 27, 2023

(65) Prior Publication Data

US 2023/0305282 A1 Sep. 28, 2023

(30) Foreign Application Priority Data

Mar. 25, 2022 (JP) ................................. 2022-049705
Nov. 3, 2022 (KR) ........................ 10-2022-0145462

(51) Int. Cl.
 *G02B 21/00* (2006.01)
 *G02B 21/06* (2006.01)
 *G02B 21/36* (2006.01)
(52) U.S. Cl.
 CPC ......... *G02B 21/0092* (2013.01); *G02B 21/06* (2013.01); *G02B 21/361* (2013.01)
(58) Field of Classification Search
 CPC .. G02B 21/0092; G02B 21/06; G02B 21/361; G02B 27/56; G02B 27/58; G02B 3/0006;
 (Continued)

(56) References Cited

U.S. PATENT DOCUMENTS 4,410,277 A 10/1983 Yamamoto et al.
5,838,444 A 11/1998 Jo
 (Continued)

FOREIGN PATENT DOCUMENTS

JP H02-87678 A 3/1990
JP H05-215828 A 8/1993
 (Continued)

OTHER PUBLICATIONS

P. Wolniansky et al. 'Magneto-optical measurements of hysteresis loop and anisotropy energy constants on amorphous $Tb_xFe_{1-x}$ alloys' *Journal of Applied Physics*, 60, 1989, pp. 346-351.
 (Continued)

*Primary Examiner* — Mustak Choudhury
(74) *Attorney, Agent, or Firm* — Fish & Richardson P.C.

(57) ABSTRACT

The polarized microscope includes a light source configured to generate illumination light, a polarizer configured to interact with the generated illumination light to transmit rectilinear polarized light having a first orientation, an analyzer configured to transmit a component of rectilinear polarized light reflected by a sample, the reflected rectilinear polarized light having a second orientation, an image obtainer configured to obtain an image of the reflected rectilinear polarized light, and an image processor configured to process the obtained image, wherein the image processor is configured to calculate a device integer, obtain a plurality of hysteresis loops for each of regions of interest (ROIs), and calculate a rotation angle of a Kerr rotation of each ROI by using the device integer and the plurality of hysteresis loops.

20 Claims, 25 Drawing Sheets

(58) Field of Classification Search
CPC ............... G02B 3/0037; G01R 33/032; G01R 33/0322; G01R 33/0325; G01R 33/1292
See application file for complete search history.

(56) References Cited

U.S. PATENT DOCUMENTS

| | | | |
|---|---|---|---|
| 6,046,448 A | | 4/2000 | Sato et al. |
| 6,528,993 B1 * | | 3/2003 | Shin ..................... G01R 33/032 |
| | | | 359/489.08 |
| 7,084,624 B2 | | 8/2006 | Tokura et al. |
| 9,110,316 B2 * | | 8/2015 | Eliseev ..................... C25D 1/08 |
| 11,043,239 B2 * | | 6/2021 | Wang ..................... G02B 5/001 |
| 2006/0250129 A1 * | | 11/2006 | Wu ..................... G01R 33/1207 |
| | | | 324/228 |
| 2021/0405086 A1 * | | 12/2021 | te Velthuis ............. G01N 21/21 |

FOREIGN PATENT DOCUMENTS

| | | |
|---|---|---|
| JP | H09-178649 A | 7/1997 |
| JP | H10-325840 A | 12/1998 |
| JP | 2001-215263 A | 8/2001 |
| JP | 2009-042040 A | 2/2009 |
| JP | 2013-205400 A | 10/2013 |
| JP | 2018-028519 A | 2/2018 |
| JP | 2018116136 A * | 7/2018 |
| WO | WO-2004/019051 A1 | 3/2004 |

OTHER PUBLICATIONS

S. Meguro et al. 'Development of Kerr Effect Microscope with Detection of Local Magnetization Direction and Its Application to Spatial Magnetic Field Detection', vol. 52, No. 3, 2017, pp. 119-123.

Office Action in Japanese Appln. No. 2022-049705, mailed on Jul. 29, 2025, 4 pages (with English translation).

* cited by examiner

|  | max-min | ratio |
|---|---|---|
| UL | 0.016 | 0.792 |
| LL | 0.022 | 1.125 |
| CE | 0.020 | 1.000 |
| UR | 0.018 | 0.909 |
| LR | 0.024 | 1.177 |

|     | Θk [deg] | ratio |
|-----|----------|-------|
| UL  | 0.060    | 0.964 |
| LL  | 0.059    | 0.949 |
| CE  | 0.062    | 1.000 |
| UR  | 0.059    | 0.953 |
| LR  | 0.060    | 0.958 | spot measutement $a(x, y)$       $\Theta_0(x, y)$       $\eta^2(x, y)$

FIG. 16

$$I = D + R \tanh \ (\alpha(H \pm Hc)) \tag{0}$$

$$2\Delta\Theta(x,y) = \frac{C_2(x,y)\{(1-2\eta^2(x,y))\sin^2(\beta_2-\Theta(x,y))+\eta^2(x,y)\}-AC_1(x,y)\{(1-2\eta^2(x,y))\sin^2(\beta_1-\Theta(x,y))+\eta^2(x,y)\}}{(1-2\eta^2(x,y))\{\sin(2(\beta_2-\Theta(x,y))-A\sin(2(\beta_1-\Theta(x,y))\}} \tag{1}$$

$$A = \frac{1+\cos(2(\beta_1-\Theta(x,y))}{1+\cos(2(\beta_2-\Theta(x,y))} \tag{2}$$

$$I(\Theta,\eta) = (1-2\eta^2)\sin^2\Theta + \eta^2 \tag{3}$$

$$I(\Theta,\eta) = a[(1-2\eta^2)\sin^2(\Theta a - \Theta) + \eta^2] \tag{4}$$

$$I_\pm = a[(1-2(\eta \pm \Delta\eta)^2)\sin^2(\Theta a - (\Theta \pm \Delta\Theta)) + (\eta \pm \Delta\eta)^2] \tag{5}$$

$$I_\pm \cong [(1-2(\eta^2 \pm 2\eta\Delta\eta)^2)\sin^2(\Theta \pm \Delta\Theta)) + \eta^2 \pm 2\eta\Delta\eta] \tag{6}$$

$$\Delta I = (1-2\eta^2+4\eta\Delta\eta)\sin(2\Theta)\sin(2\Delta\Theta) + 4\eta\Delta\eta(1+\cos(2(\Theta+\Delta\Theta)) \tag{7}$$

$$C = \frac{(1-2\eta^2+4\eta\Delta\eta)\sin(2\Theta)\sin(2\Delta\Theta)+4\eta\Delta\eta(1+\cos(2(\Theta+\Delta\Theta))}{[(1-2\eta^2)\sin^2(\Theta)+\eta^2]} \tag{8}$$

$$(1-2\eta^2)(C_2\sin^2\Theta_2-C_1\sin^2\Theta_1)+\eta^2(C_2-C_1) = (1-2\eta^2)\left[\sin(2\Theta_2)\sin(2\Delta\Theta)-\sin(2\Theta_1)\sin(2\Delta\Theta)\frac{1+\cos(2\Theta_2)\cos(2\Delta\Theta)}{1+\cos(2\Theta_1)\cos(2\Delta\Theta)}\right] \tag{9}$$

$$2\Delta\eta(x,y) = \frac{C_1[(1-2\eta^2(x,y))\sin^2(\beta_1-\Theta(x,y))+\eta^2(x,y)]-(1-2\eta^2(x,y))\sin(2(\beta_1-\Theta(x,y))\times 2\Delta\Theta(x,y)}{2\eta(x,y)(1+\cos(2(\beta_1-\Theta(x,y)))} \tag{10}$$

POLARIZED MICROSCOPE AND INTRA IMAGE FIELD CORRECTION ANALYSIS METHOD

CROSS-REFERENCE TO RELATED APPLICATION

This application claims the benefit of Japanese Patent Application No. 10-2022-049705, filed on Mar. 25, 2022, in the Japanese Patent Office, and Korean Patent Application No. 10-2022-0145462, filed on Nov. 3, 2022, in the Korean Intellectual Property Office, the disclosure of which is incorporated by reference herein in their entireties.

BACKGROUND

The disclosed example embodiments relate to a polarized microscope and an intra image view correction analysis method.

Kerr effect microscopes and magnetic domain observation microscopes are based on classical polarized microscopes and are widely used.

SUMMARY

The disclosed example embodiments provide a polarized microscope for measuring a magnetic characteristic with high precision and an intra image field correction analysis method.

According to an example embodiments of the inventive concepts, there is provided a polarized microscope including a light source configured to generate illumination light, a polarizer configured to interact with the generated illumination light to transmit rectilinear polarized light having a first orientation, an analyzer configured to transmit a component of rectilinear polarized light reflected by a sample, the reflected rectilinear polarized light having a second orientation, an image obtainer configured to obtain an image of the reflected rectilinear polarized light, and an image processor configured to process the obtained image, wherein the image processor is configured to calculate a device integer, obtain a plurality of hysteresis loops for each of regions of interest (ROIs), and calculate a rotation angle of a Kerr rotation of each ROI by using the device integer and the plurality of hysteresis loops.

According to another example embodiments of the inventive concepts, there is provided a polarized microscope including a light source configured to generate illumination light, a polarizer configured to interact with the generated illumination light to transmit rectilinear polarized light having a first orientation, an analyzer configured to transmit a component of the rectilinear polarized reflected by a sample, the reflected rectilinear polarized light having a second orientation, an image obtainer configured to obtain an image of the reflected rectilinear polarized light, a magnet configured to generate an external magnetic field applied to the sample, and an image processor configured to process the obtained image, wherein the image processor is configured to obtain a plurality of images by irradiating the rectilinear polarized light onto a sample regarded as a non-magnetic specular sample by using the sample in a state where a magnetic field is not applied thereto, while rotating an angle between the first orientation and the second orientation at a certain interval within a certain range, and calculate, from the plurality of images, a device integer, including a distribution of polarization rotation angle and a distribution of square of ellipticity based on ellipticity for each ROI of an intra image field including a plurality of ROIs, obtain a hysteresis loop of a brightness value of each ROI in response to the angle between the first orientation and the second orientation being set to a first angle, obtain a hysteresis loop of a brightness value of each ROI in response to the angle between the first orientation and the second orientation being set to a second angle, obtain the hysteresis loop of the brightness value of each ROI and calculate a rotation angle of a Kerr rotation for each ROI, based on analysis using the device integer, the hysteresis loop corresponding to the first angle, and the hysteresis loop corresponding to the second angle.

According to another example embodiments of the inventive concepts, there is provided an intra image field correction analysis method using a polarized microscope including a light source configured to generate illumination light, a polarizer configured to interact with the generated illumination light to transmit rectilinear polarized light having a first orientation, an objective lens configured to irradiate the reflected rectilinear polarized light onto a sample and simultaneously transmit reflected rectilinear polarized light obtained through reflection of the rectilinear polarized light by the sample, an analyzer configured to transmit a component of the rectilinear polarized light having a second orientation in the reflected light, an image obtainer configured to obtain an image of the reflected light, a magnet configured to generate an external magnetic field applied to the sample, and an image processor configured to process the obtained image, wherein the intra image field correction analysis method includes a first operation of obtaining a plurality of images by irradiating polarized illumination light onto the sample which is non-magnetic or onto the sample which includes a magnetic material and is regarded as a non-magnetic specular sample by using the sample in a state where a magnetic field is not applied thereto, while rotating an angle between the first orientation and the second orientation at a certain interval within a certain range, and calculating, from the obtained plurality of images, a device integer, including a distribution of polarization rotation angle and a distribution of square of ellipticity based on ellipticity for each ROI of an intra image field including a plurality of ROIs, a second operation of, in response to the angle between the first orientation and the second orientation being set to a first angle, obtaining a hysteresis loop of a brightness value of each ROI from a plurality of images obtained while irradiating the polarized illumination light onto a magnetic material portion of the sample including the magnetic material and simultaneously sweeping the external magnetic field, and in response to the angle between the first orientation and the second orientation being set to a second angle, obtaining the hysteresis loop of a brightness value of each ROI from a plurality of images obtained while irradiating the rectilinear polarized light onto the magnetic material portion of the sample including the magnetic material and simultaneously sweeping the external magnetic field, and a third operation of calculating a rotation angle of a Kerr rotation for each ROI, based on analysis using the device integer, the hysteresis loop corresponding to the first angle, and the hysteresis loop corresponding to the second angle.

BRIEF DESCRIPTION OF THE DRAWINGS

Example embodiments will be more clearly understood from the following detailed description taken in conjunction with the accompanying drawings in which:

FIG. 16 is a diagram illustrating an equation used in an intra image field correction analysis method according to Embodiment 1;

DETAILED DESCRIPTION OF THE EXAMPLE EMBODIMENTS

Figure 1:
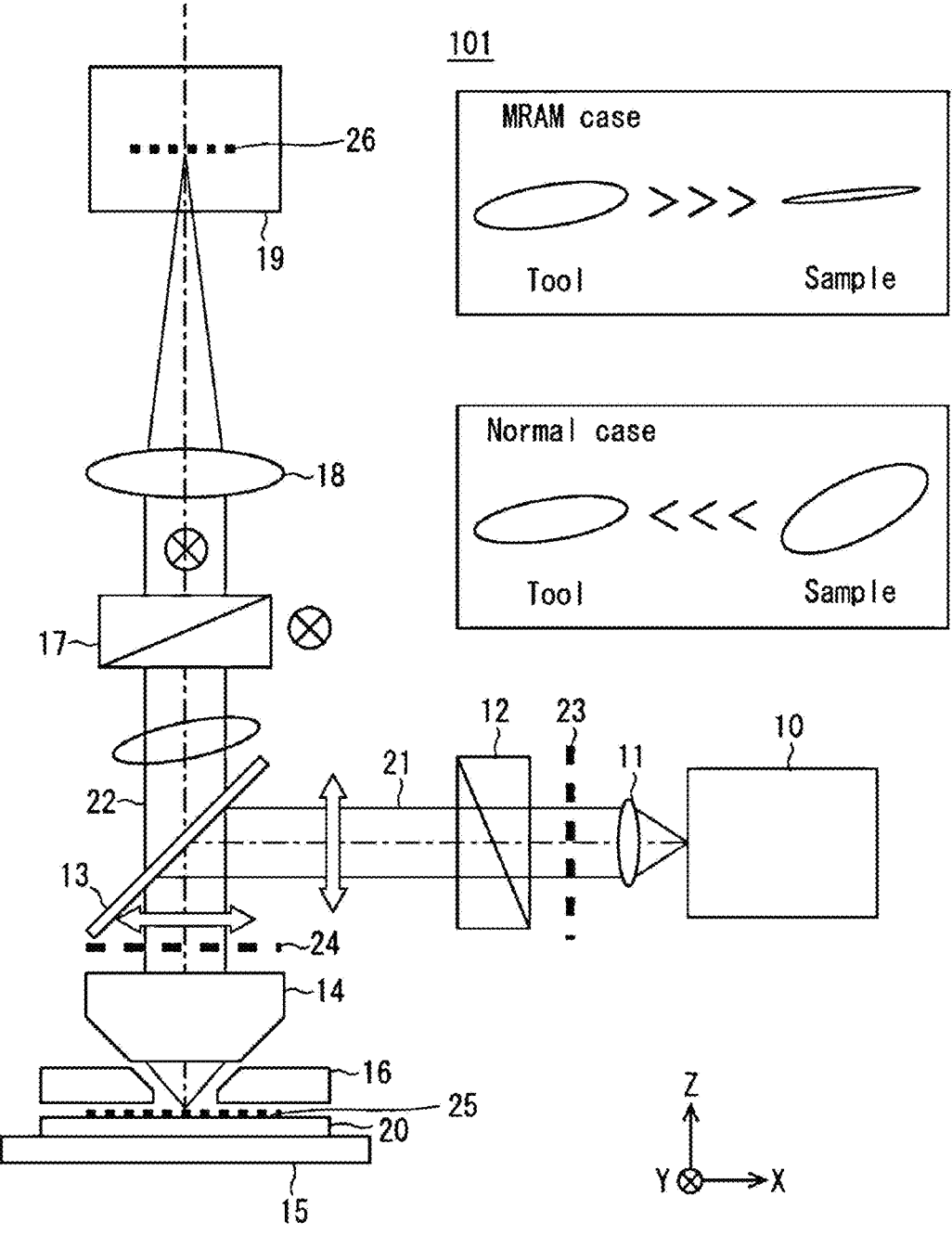
FIG. 1 is a configuration diagram illustrating a polarized microscope such as a magnetic domain microscope of a comparative example.

Hereinafter, various example embodiments will be described in detail with reference to the accompanying drawings. Like reference numerals refer to like elements in the drawings, and their repeated descriptions are omitted.

A Kerr effect microscope may irradiate a laser beam while sweeping an external magnetic field to measure the amount of change of a polarization component of reflected light, with respect to a sample including a magnetic material of a magnetic thin film, and thus, may obtain a 1-point magnetic hysteresis loop in a sample. Furthermore, a magnetic domain microscope may apply an external magnetic field to a sample including a magnetic material of a magnetic thin film and may record, as a brightness change of an image sensor, a polarization component change of reflected light when light from an incoherent light source is irradiated as polarized light onto the sample by a polarizer, and thus, the magnetic domain microscope may record a magnetic domain pattern of an intra image field.

A hysteresis loop of each pixel may be obtained by recording brightness of each pixel while sweeping an external magnetic field by using a magnetic domain microscope, but in the magnetic domain microscope, a difference in polarization characteristic of an intra image field may be greater than a change in polarization occurring in a sample. Therefore, because it is difficult to quantitatively evaluate a hysteresis loop of an intra image field, a magnetization characteristic may not be measured with high precision.

Comparative Example

Before describing a polarized microscope according to Embodiment 1, a polarized microscope of a comparative example and objects thereof will be described. Therefore, a polarized microscope according to the present example embodiment will be described in more detail. Also, a configuration and an object of the comparative example may be included in the scope of some example embodiments.

FIG. 1 is a configuration diagram illustrating a polarized microscope 101 such as a magnetic domain microscope of a comparative example. As illustrated in FIG. 1, the polarized microscope 101 of the comparative example may include a light source 10, a lens 11, a polarizer 12, a beam splitter 13, an objective lens 14, a stage 15, a magnet 16, an analyzer 17, an imaging lens 18, and an image obtainer 19. A sample 20 may be disposed on the stage 15.

Here, for convenience of a description of the polarized microscope 101, an XYZ orthogonal coordinate axis system may be introduced. For example, a direction perpendicular to a top of the stage 15 may be referred to as a Z-axis direction, and a surface parallel to (or substantially parallel to) the top of the stage 15 may be referred to as an XY plane. Hereinafter, each element will be described.

The light source 10 may generate illumination light 21. The light source 10 may include, for example, a halogen lamp or a white light-emitting diode (LED). The illumination light 21 may be white light. The light source 10 may irradiate the generated illumination light 21 onto the polarizer 12. The lens 11 may be disposed between the light source 10 and the polarizer 12. The illumination light 21 converted into parallel light by the lens 11 may be incident on the polarizer 12.

The polarizer 12 may be disposed at an illumination pupil 23 of the illumination light 21 or a periphery thereof. The illumination light 21 generated by the light source 10 may be incident on the polarizer 12. The polarizer 12 may convert the incident illumination light 21 into the illumination light 21 including rectilinear polarized light. For example, the polarizer 12 may transmit illumination light including a rectilinear polarized light of a first orientation. For example, the first orientation may be a Z-axis direction. In this case, the polarizer 12 may convert the illumination light 21 to include rectilinear polarized light of the Z-axis direction. That is, a transmission axis of the polarizer 21 may be the Z-axis direction. The illumination light 21 converted to include rectilinear polarized light by the polarizer 12 may be incident on the beam splitter 13.

The beam splitter 13 may reflect a portion of the incident illumination light 21 toward the objective lens 14. The illumination light 21 reflected by the beam splitter 13 may include, for example, rectilinear polarized light of an X-axis direction. The objective lens 14 may be disposed between the beam splitter 13 and the sample 20. The objective lens 14 may be disposed at a position of a pupil plane 24 or a periphery thereof. The objective lens 14 may allow the sample 20 to collect the illumination light 21 reflected by the beam splitter 13. The objective lens 14 may irradiate the illumination light 21 including rectilinear polarized light onto the sample 20. Furthermore, a magnetic thin film sample according to some example embodiments may have an island pattern having a sufficient size (for example, $\Phi$ may be hundreds $\mu m$) or a non-pattern thin film sample.

The sample 20 may include a magnetic material such as a magnetic thin film. The sample 20 may include, for example, a magnetic thin film film-formed on a wafer. Also, the sample 20 may include a magnetic thin film used in magnetoresistive random access memory (MRAM). A magnetic material of the sample 20 disposed on the stage 15 may be supplied with, for example, an external magnetic field in the Z-axis direction. When a direction of the external magnetic field is changed to an upward direction or a downward direction, a magnetization direction of the magnetic material may be changed to an upward direction or a downward direction. Furthermore, the sample 20 in calibration described below may include a non-magnetic sample 20.

The magnet 16 may be disposed between the sample 20 and the objective lens 14. The magnet 16 may be, for example, an electromagnet for modulating a direction and/or strength of a magnetic field to the sample 20. Furthermore, the magnet 16 may be a permanent magnet. The magnet 16 may generate an external magnetic field applied to the sample 20. Therefore, the magnet 16 may apply the external magnetic field to the sample 20. For example, in a case which inspects a free layer including a vertical magnetic anisotropic material of MRAM, a polar Kerr effect may be detected. Therefore, the magnet 16 may apply a vertical-direction magnetic field to a surface of the sample 20. When the magnet 16 is an electromagnet, an external magnetic field within a range of a +Z direction to −Z direction may be applied to the sample 20 by controlling a direction and/or a current value flowing in the electromagnet.

Also, in order to detect the polar Kerr effect, incident light incident on the sample 20 may be vertically incident on the surface of the sample 20, and rectilinear polarized light where a vibration direction of an electric field is an XY plane may be needed or desired. In the sample 20, a polarization state may be slightly changed by a Kerr effect, based on a magnetic field strength H of the external magnetic field. The Kerr effect may be a polarization-axis rotation (hereinafter referred to as a Kerr rotation) and Kerr ellipticity.

Figure 2:
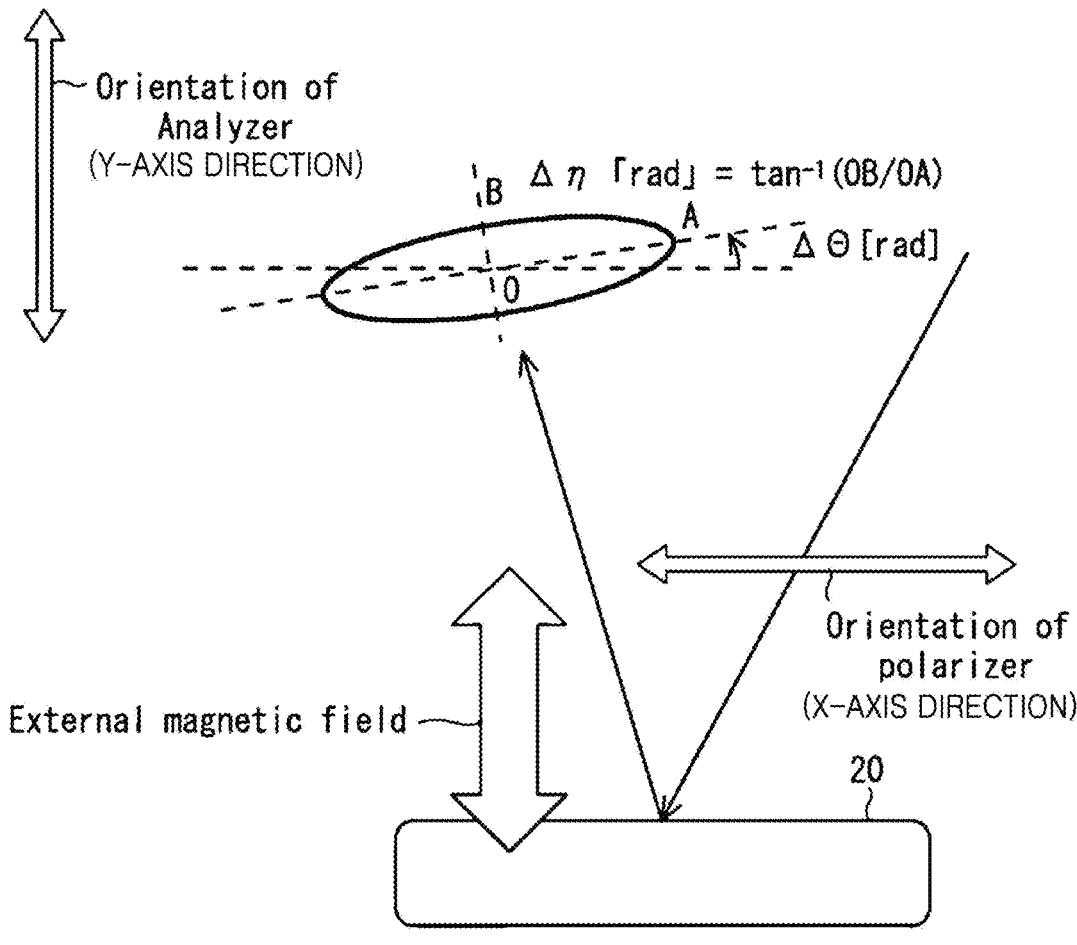
FIG. 2 is a schematic diagram illustrating a Kerr effect in the polarized microscope such as the magnetic domain microscope of the comparative example.

FIG. 2 is a schematic diagram illustrating the Kerr effect in the polarized microscope such as the magnetic domain microscope of the comparative example. As illustrated in FIG. 2, the Kerr effect may include a rotation angle $\Delta\Theta$ of a rotation of a polarization axis (hereinafter referred to as a rotation angle $\Delta\Theta$ of a rotation of an orientation) and ellipticity including a variation $\Delta\eta$ of an ellipticity. The variation $\Delta\eta$ of the ellipticity may be, for example, $\tan^{-1}$ (OB/OA). Here, OA may denote a short radius, and OB may denote a long radius. Reflected light 22 reflected by the sample 20 may be modulated to a polarization state by the Kerr effect based on the sample 20.

Returning to FIG. 1, the reflected light 22 reflected by the sample 20 may be incident on the objective lens 14. The objective lens 14 may transmit the reflected light 22 which is obtained when the illumination light 21 is reflected by the sample 20. The reflected light 22 may pass through objective lens 14 and the beam splitter 13 and may be incident on the analyzer 17.

The analyzer 17 may be disposed between the beam splitter 13 and the image obtainer 19. The analyzer 17 may transmit a component of rectilinear polarized light of a second orientation in the reflected light 22. The second direction may be, for example, a Y-axis direction. In this case, the analyzer 17 may convert the reflected light 22 to include rectilinear polarized light of the Y-axis direction.

That is, a transmission axis of the analyzer 17 may be the Y-axis direction. A direction (a transmission axis) of rectilinear polarized light passing through the analyzer 17 may be disposed to be perpendicular to a direction (a transmission axis) of rectilinear polarized light passing through the polarizer 12. For example, the direction of the rectilinear polarized light passing through the polarizer 12 may be an X-axis direction, and the direction of the rectilinear polarized light passing through the analyzer 17 may be the Y-axis direction. As described above, disposition where the transmission axis of the analyzer 17 is perpendicular to that of the polarizer 12 may be referred to as cross Nicole disposition. By cross Nicole disposition, as a brightness change, a change in polarized light including rectilinear polarized light may be detected with high sensitivity. The reflected light 22 including polarized light having slightly-performed rotation and elliptical in the sample 20 may transmit a strength of the square of an amplitude projected on the transmission axis of the analyzer 17. The reflected light 22 passing through the analyzer 17, for example, may be incident on the image obtainer 19 with the imaging lens 18 therebetween.

The image obtainer 19 may detect, as a variation of strength, a change in a polarization component of the reflected light 22. Therefore, the image obtainer 19 may obtain an image of the reflected light 22. For example, the image obtainer 19 may obtain an intra-view image. The image obtainer 19 may include, for example, a camera. The image obtainer 19 may include, for example, an image sensor including a photodiode (PD) array. Also, the image obtainer 19 is not limited to the camera or the image sensor and may include an element for obtaining an image. An imaging surface 26 of the image obtainer 19 may be in an image conjugate relationship with a measurement surface 25 of the sample 20.

Here, a rotation angle $\Delta\Theta$ of an orientation rotation occurring in the sample 20 for MRAM described above may be 0.1 degrees or less conventionally. Also, a variation of an ellipticity $\Delta\eta$ may be a slight variation equal to the same level as the rotation angle $\Delta\Theta$. An ellipticity $\eta$ may be an ellipticity angle (the amount of angle) where flatness of an ellipse is defined as arctan. A magnetic domain microscope may be a microscope based on a pattern of an intra image field. Therefore, the magnetic domain microscope may need or preferably include a condition which enables recognition of a magnetic domain of an intra image field and may not need a quantitative value of each of the variation $\Delta\eta$ of the ellipticity and the rotation angle $\Delta\Theta$. Also, the magnetic domain microscope may not need a quantitative analysis error of a pattern contrast between places in an intra image field.

As illustrated in a right upper region of FIG. 1, in the sample 20 for MRAM, each of the variation of the ellipticity $\Delta\eta$ and the rotation angle $\Delta\Theta$ may be one or more digits less than an error caused by a tool, and due to this, it may be difficult to detect the Kerr effect occurring in the sample 20. Furthermore, in a general magnetic sample, the Kerr effect occurring in the sample 20 may be greater than the error caused by the tool, and thus, the Kerr effect may be detected.

In the following description, a spot meter which uses a laser beam and is a reference device will be described. The spot meter may be a device well known, and the most of products may be in the market. Hereinafter, a device for measuring a spot may be referred to as a spot meter.

The spot meter may perform measurement based on a differential polarization method. The spot meter may irradiate a laser beam including rectilinear polarized light onto the sample 20 to sweep a magnetic field applied to the sample 20. Also, the spot meter may split reflected light, including polarized light modulated by the sample 20, into s-polarized light and p-polarized light by using a polarization splitting prism while sweeping a magnetic field. Therefore, a rotation angle of a Kerr rotation occurring in the sample 20 may be measured through lock-in differential processing by two photo detectors of the spot meter. Accordingly, a hysteresis loop may be obtained by plotting a magnetic field onto a horizontal axis and plotting a rotation angle onto a vertical axis. Generally, the spot meter may denote a magneto-optical Kerr effect (MOKE) device or a Kerr effect measurement device. The obtained hysteresis loop may measure a physical amount, and thus, a quantitative characteristic of a magnetic thin film thereof may be evaluated. Also, such a method may be a method which changes an evaluation position while moving a sample and may use only a center of an optical system and may detect a velocity of reflected light by using a photo detector, and thus, a device error may not be included in the evaluation position.

However, in the magnetic domain microscope described above, in a case which obtains an image while sweeping an external magnetic field, a hysteresis loop may be obtained by plotting the external magnetic field onto a horizontal axis and plotting a brightness value onto a vertical axis. The hysteresis loop obtained in this manner may approximately correlate with a hysteresis loop in spot measurement using a laser beam. A magnetic domain microscope may obtain a hysteresis loop by using one function thereof. However, a function of obtaining the hysteresis loop in the magnetic domain microscope may be just a criterion. For example, in the magnetic domain microscope, the inventor has recognized that a large difference (error) between measurement coordinates occurs in a hysteresis loop obtained from a plurality of different measurement coordinates of an intra image field. This will be described below with reference to FIG. 3.

Figure 3:
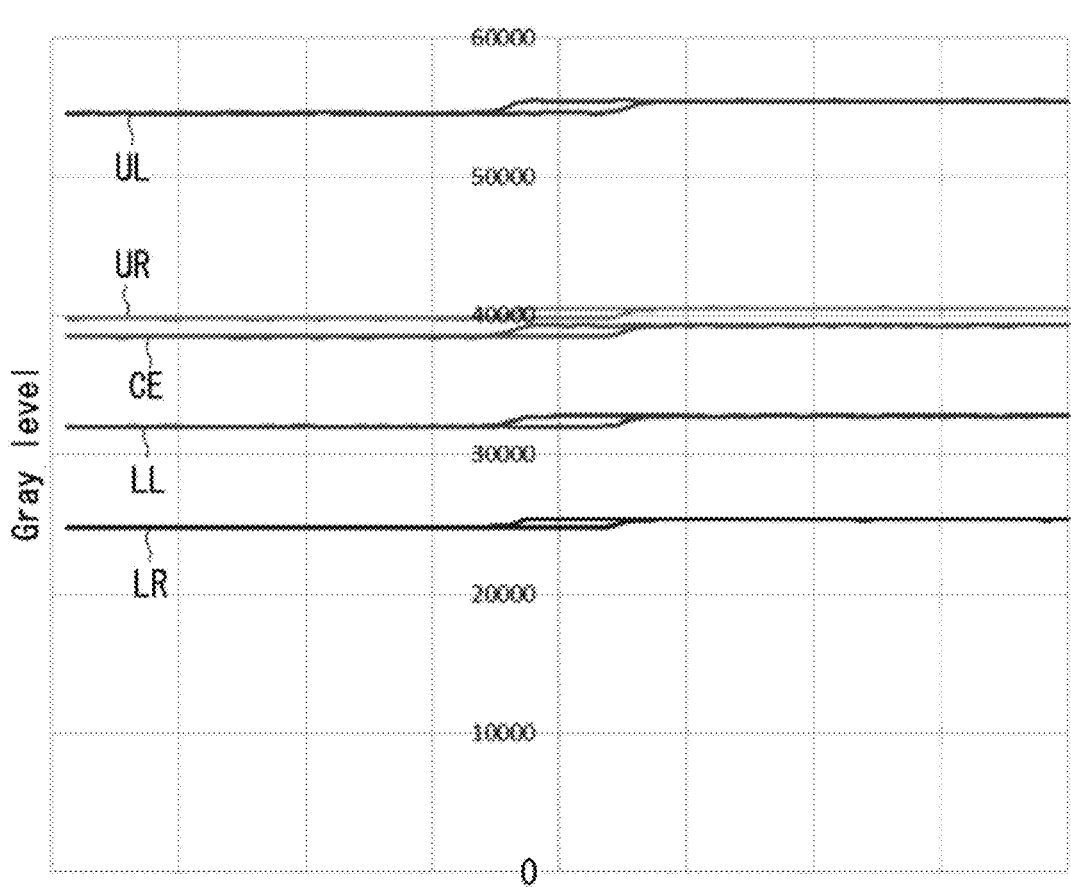
FIG. 3 is a graph showing a hysteresis loop in five regions of interest (ROIs) of an intra image field measured by the polarized microscope such as the magnetic domain microscope of the comparative example, a horizontal axis representing an external magnetic field and a vertical axis representing a luminance value.

FIG. 3 is a graph showing a hysteresis loop in five regions of interest (ROIs) of an intra image field measured by the polarized microscope such as the magnetic domain microscope of the comparative example, the horizontal axis representing an external magnetic field, and the vertical axis representing a luminance value. In FIG. 3, the five ROIs may include a center image field CE, a right upper image field UR, a left upper image field UL, a right lower image field LR, and a left lower image field LL.

Figure 4:
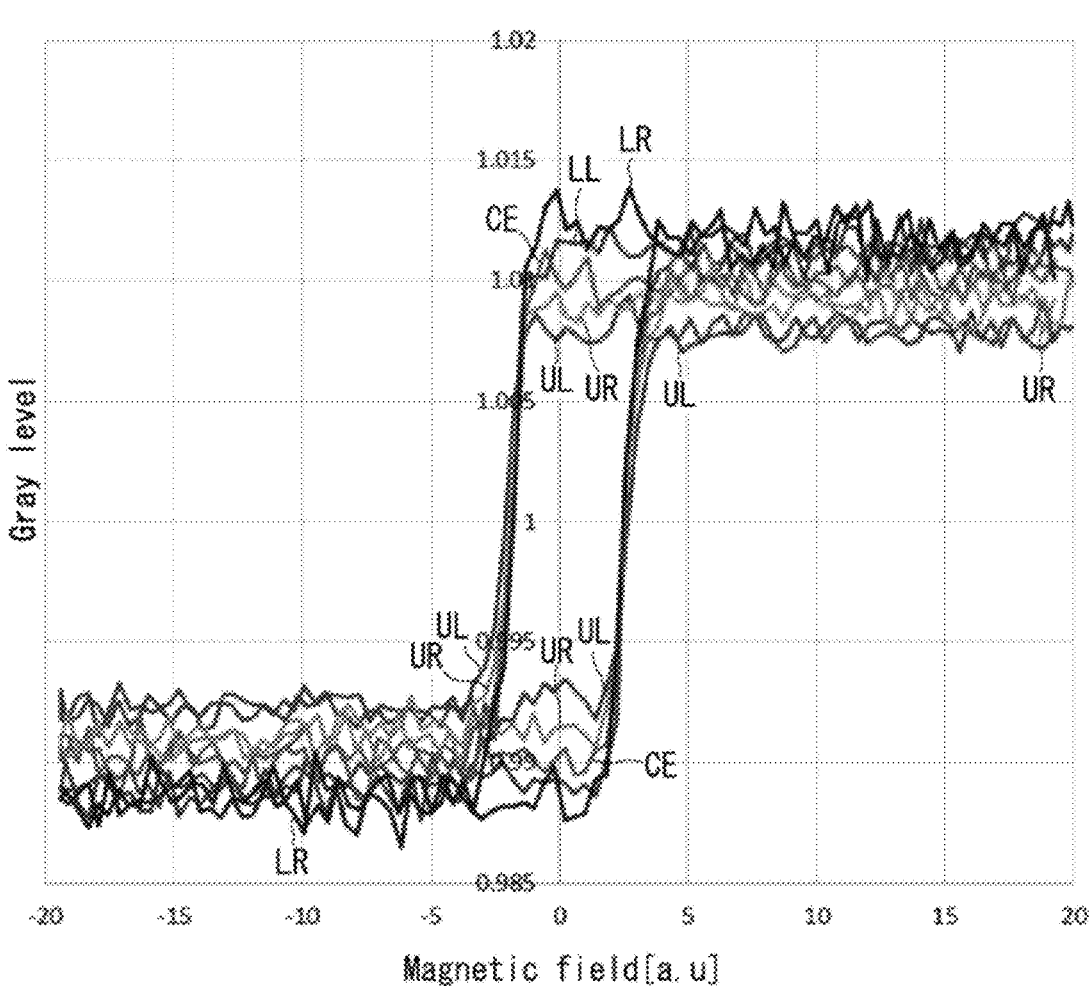
FIG. 4 illustrates an example where a hysteresis loop in five ROIs of an intra image field measured by the polarized microscope such as the magnetic domain microscope of the comparative example is normalized to an average of brightness values of the ROIs and is normalized to an average in an ROI of a center image field.

FIG. 4 illustrates an example where a hysteresis loop in five ROIs of an intra image field measured by the polarized microscope such as the magnetic domain microscope of the comparative example is normalized to an average of brightness values of the ROIs and is normalized to an average in an ROI of a center image field CE. In FIG. 4, after-normalization values may be shown in a table. That is, a difference between a maximum value and a minimum value (or alternatively, a high value and low value) of brightness values of each ROI may represent a ratio of an average of brightness values of each ROI in the center image field CE.

Figure 5:
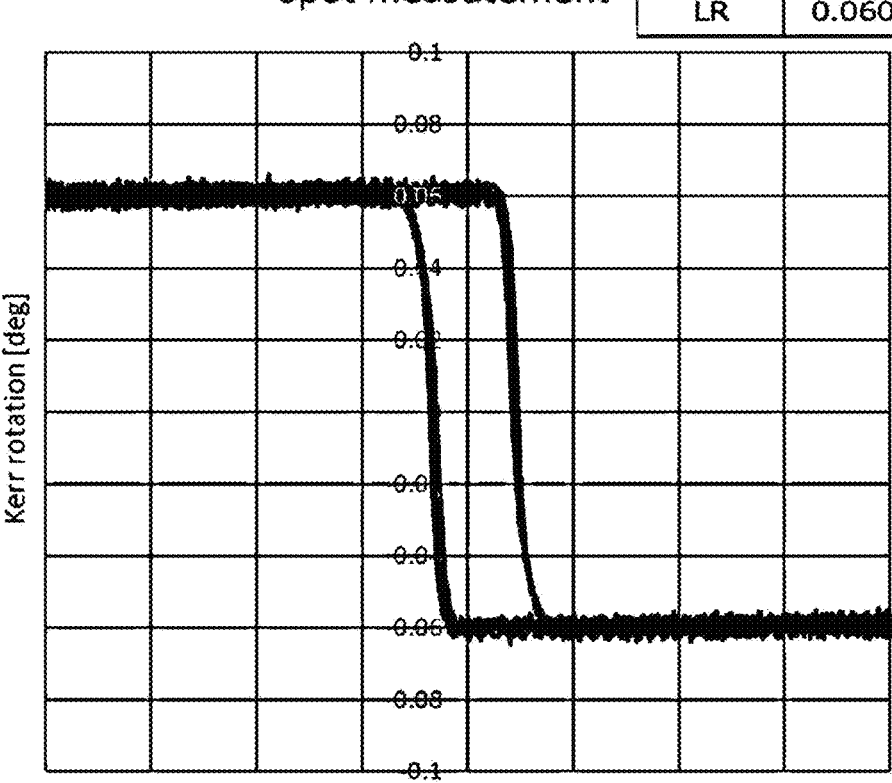
FIG. 5 is a graph showing a hysteresis loop in five ROIs of an intra image field measured by a spot meter of a comparative example, a horizontal axis representing an external magnetic field and a vertical axis representing a rotation angle of a Kerr rotation of a physical amount normalized to an average value in an ROI of a center image field.

FIG. 5 is a graph showing a hysteresis loop in five ROIs of an intra image field measured by a spot meter of a comparative example, the horizontal axis representing an external magnetic field and the vertical axis representing a rotation angle of a Kerr rotation of a physical amount normalized to an average value in an ROI of a center image field CE. In FIG. 5, after-normalization values may be shown in a table. That is, the graph of FIG. 5 may represent rotation angle of a Kerr rotation in each ROI and the ratio to the center image field CE.

As illustrated in FIG. 4, in a magnetic domain microscope, a magnetization contrast of each ROI in an intra image field may have a difference of about ±20%. As illustrated in FIG. 5, in a spot meter, rotation angle of each ROI in an intra image field may have a difference of about ±5%. As described above, in the magnetic domain microscope, due to a difference in magnetization contrast of each ROI in the intra image field, it may be difficult to quantitatively evaluate a hysteresis loop.

Therefore, when it is possible to correct a difference (error) in magnetization contrast for each position of an intra image field of the magnetic domain microscope of each ROI (coordinates or high image of each ROI) in the intra image field, a local hysteresis loop of the intra image field may be quantitatively treated. Accordingly, measurement of the local hysteresis loop in a plane (two-dimension) using the magnetic domain microscope may be performed. This may denote that a processing time of the spot meter using a laser beam is largely improved. In an example embodiment, measurement of the local hysteresis loop in a plane (two-dimension) using a polarized microscope such as a magnetic domain microscope may be performed. Hereinafter, such measurement may be referred to as imaging MOKE.

Embodiment 1

Figure 6:
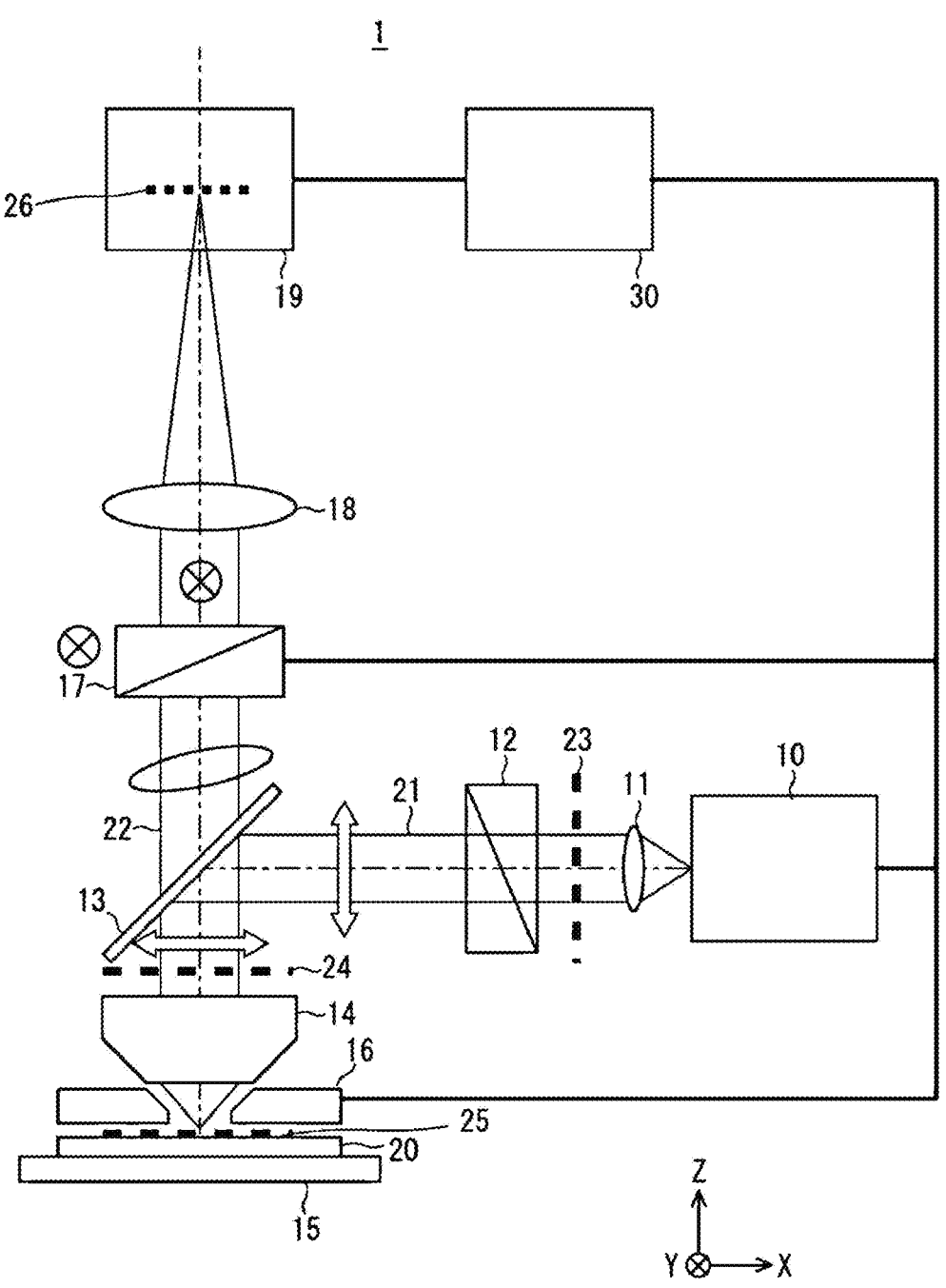
FIG. 6 is a configuration diagram illustrating a polarized microscope according to Embodiment 1.

Hereinafter, a polarized microscope and an intra image field correction analysis method according to and example embodiment "Embodiment 1" will be described. FIG. 6 is a configuration diagram illustrating a polarized microscope 1 according to Embodiment 1. As illustrated in FIG. 6, the polarized microscope 1 according to Embodiment 1 may further include an image processor 30, in addition to the elements of the polarized microscope 101 of the comparative example. The image processor 30 may process an image obtained by an image obtainer 19.

For example, the image processor 30 may perform image processing in the intra image field correction analysis method using the polarized microscope 1 illustrated in the drawings.

Figure 7:
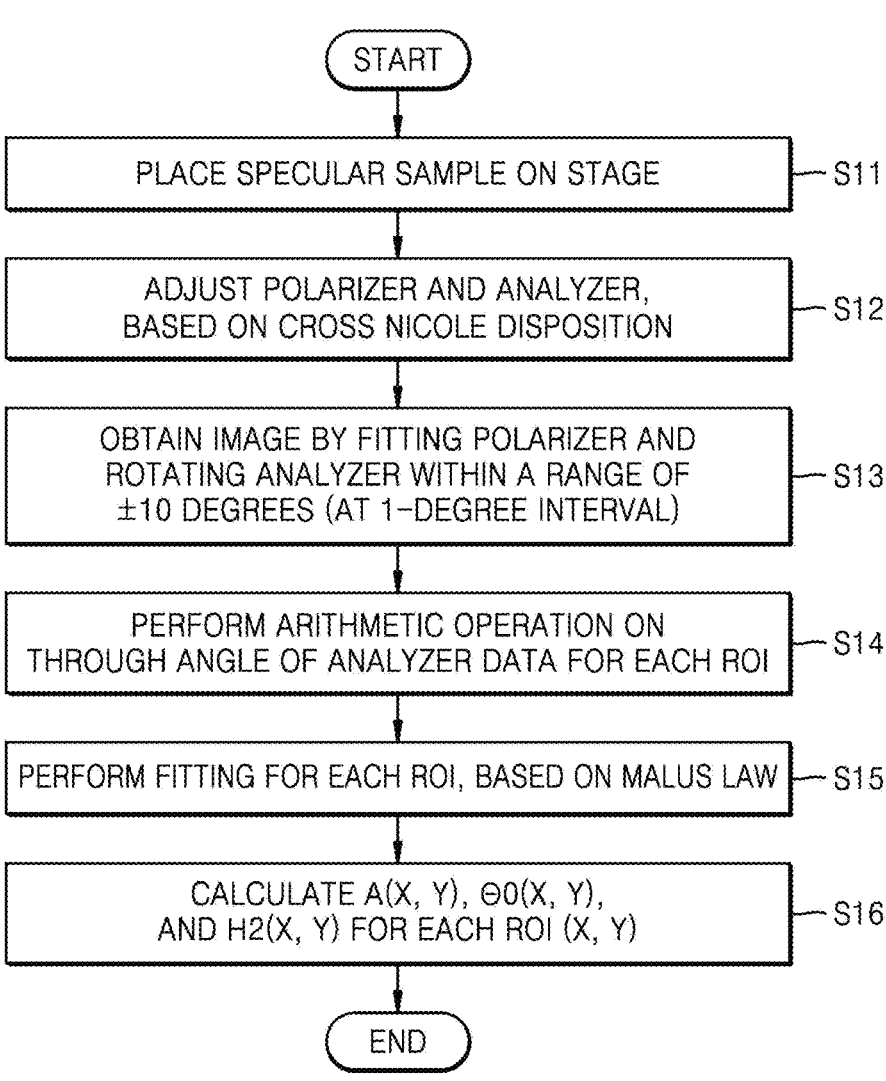
FIG. 7 is a flowchart illustrating an intra image field correction analysis method according to Embodiment 1.
Figure 8:
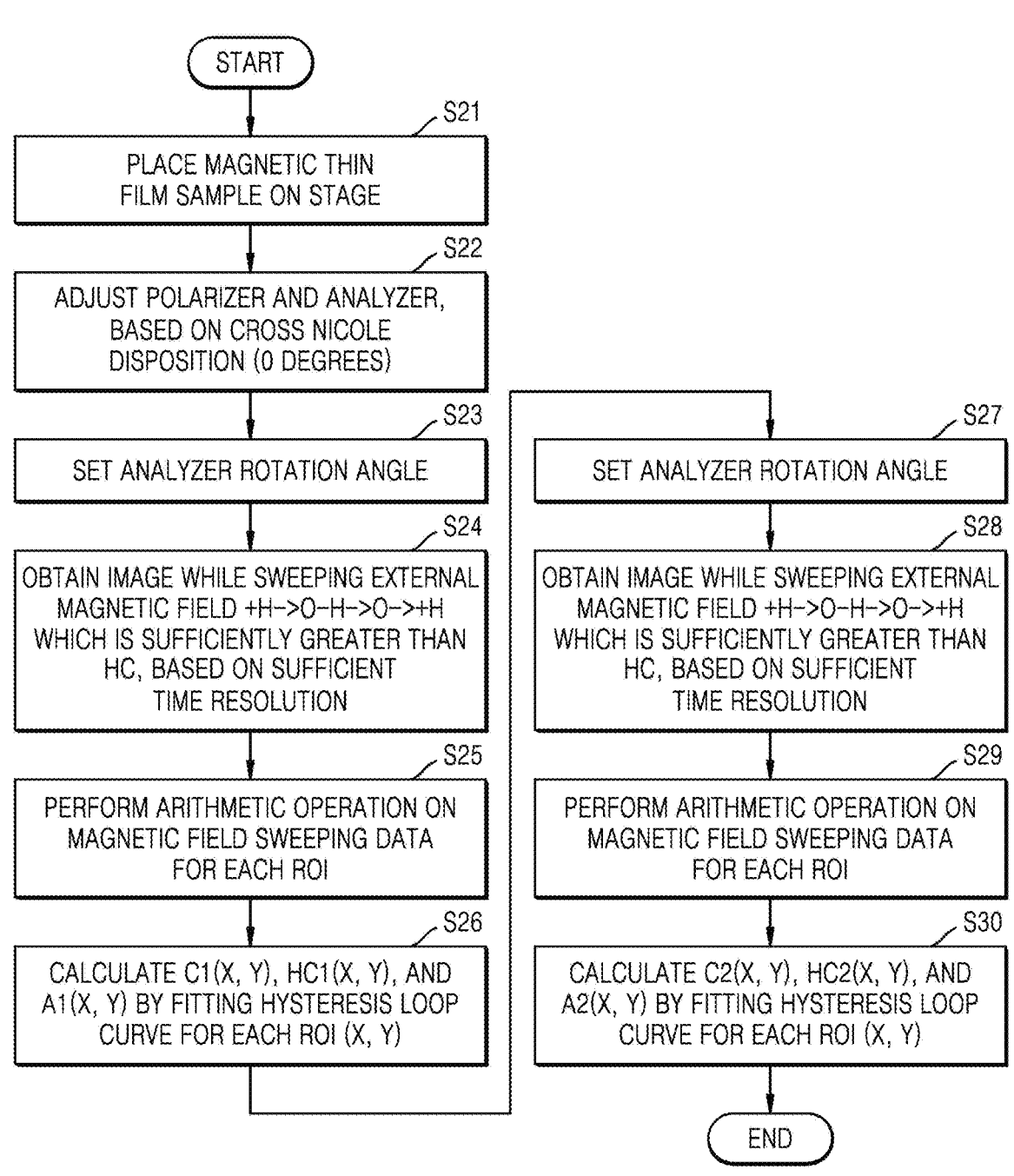
FIG. 8 is a flowchart illustrating an intra image field correction analysis method according to Embodiment 1.
Figure 9:
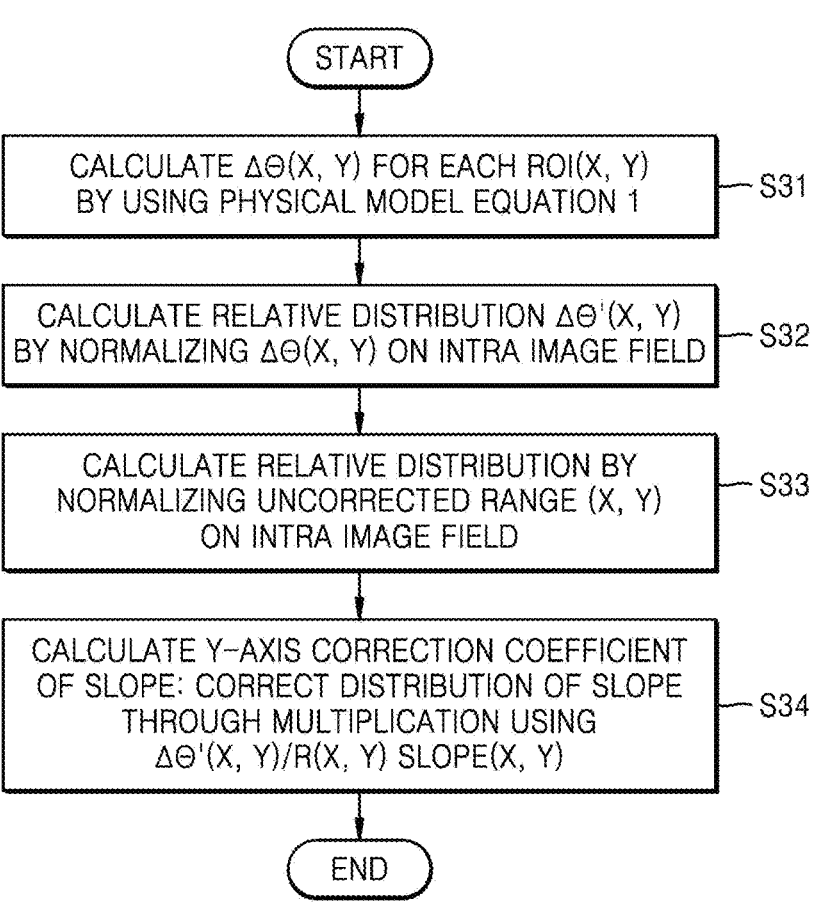
FIG. 9 is a flowchart illustrating an intra image field correction analysis method according to Embodiment 1.

FIGS. 7 to 9 are flowcharts illustrating an intra image field correction analysis method according to Embodiment 1. The intra image field correction analysis method according to the present example embodiment may include three operations, and for example, may include (i) pre-calibration where magnetic field sweeping is not performed (see FIG. 7), (ii) analysis of each ROI and obtainment of an image based on magnetic field sweeping in a sample including a magnetic material (see FIG. 8), and (iii) correction processing of a Kerr effect based on a physical model and measurement data of (i) and (ii) (see FIG. 9). Furthermore, in the following description, in defining a rotation direction, a clockwise direction CW may be defined as ⌈+⌋ and a counterclockwise direction CCW may be defined as ⌈−⌋, based on a travel direction of light.

<(i) Pre-Calibration Where Magnetic Field Sweeping is not Performed>

In the pre-calibration, first, a specular sample may be placed on the stage 15 in operation S11 of FIG. 7. The specular sample may include a magnetization thin film which is not patterned, or may include a silicon wafer. As described above, as the sample 20, a non-magnetic sample may be placed as a specular sample, or a magnetic thin film, which is not patterned in a state where a magnetic field is not applied thereto, may be placed as a non-magnetic specular sample.

Subsequently, positions of the polarizer 12 and the analyzer 17 may be adjusted for cross Nicole disposition in operation S12 of FIG. 7. This adjustment may be performed by hand or with mechanism (such as an electric motor (not shown)) controlled by the image processor 30. Conventionally, in a top of the stage 15, an orientation of polarized light included in the illumination light 21 may match one (for example, an X-axis direction) of the X-axis direction and a Y-axis direction.

Subsequently, an orientation of the polarizer 12 may be fixed. For example, an orientation of the polarizer 12 may be fixed to the X-axis direction in the top of the stage 15. In this case, at a position of the analyzer 17 based on cross Nicole disposition, the brightness of an image obtained by the image obtainer 19 may be reduced.

In this case, a position of the analyzer 17 may be set to a zero point. Hereinafter, an angle $\Theta_a$ of an orientation of the analyzer 17 at a zero point may be set to 0 degrees. Also, a of the angle $\Theta_a$ may be a subscript of $\Theta$.

Subsequently, the illumination light 21 may be irradiated onto the specular sample while rotating at an angle between the orientation of the polarizer 12 and the orientation of the analyzer 17 at a certain interval within a certain range. Accordingly, a plurality of images may be obtained in operation S13 of FIG. 17. The angle between the orientation of the polarizer 12 and the orientation of the analyzer 17 may be within a certain range (for example, a range of about ±10 degrees), and the certain interval may be, for example, about 1 degree. In this case, 21 images may be obtained while performing a rotation at an about 1 degree interval within a range of about ±10 degrees. Also, the certain range is not limited to about ±10 degrees. Also, the certain interval is not limited to about 1 degree. Also, the number of obtained images is not limited to 21.

Figure 10:
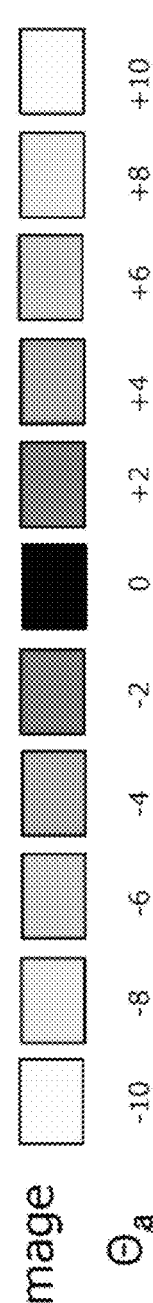
FIG. 10 is a diagram illustrating an image obtained by the polarized microscope according to Embodiment 1.

FIG. 10 is a diagram illustrating an image obtained by the polarized microscope 1 according to Embodiment 1. In FIG. 10, 11 images are simply illustrated. As illustrated in FIG. 10, in cross Nicole disposition where an angle $\Theta_a$ of the orientation of the analyzer 17 at a zero point is 0 ($\Theta_a=0$), a brightness value may be theoretically minimized or reduced.

Subsequently, a data group of a through angle of analyzer data passing through the analyzer 17 may be calculated from a plurality of obtained images for each ROI of an intra image field including a plurality of ROIs, and an arithmetic operation may be performed on the data group in operation S14 of FIG. 7.

Figure 11:
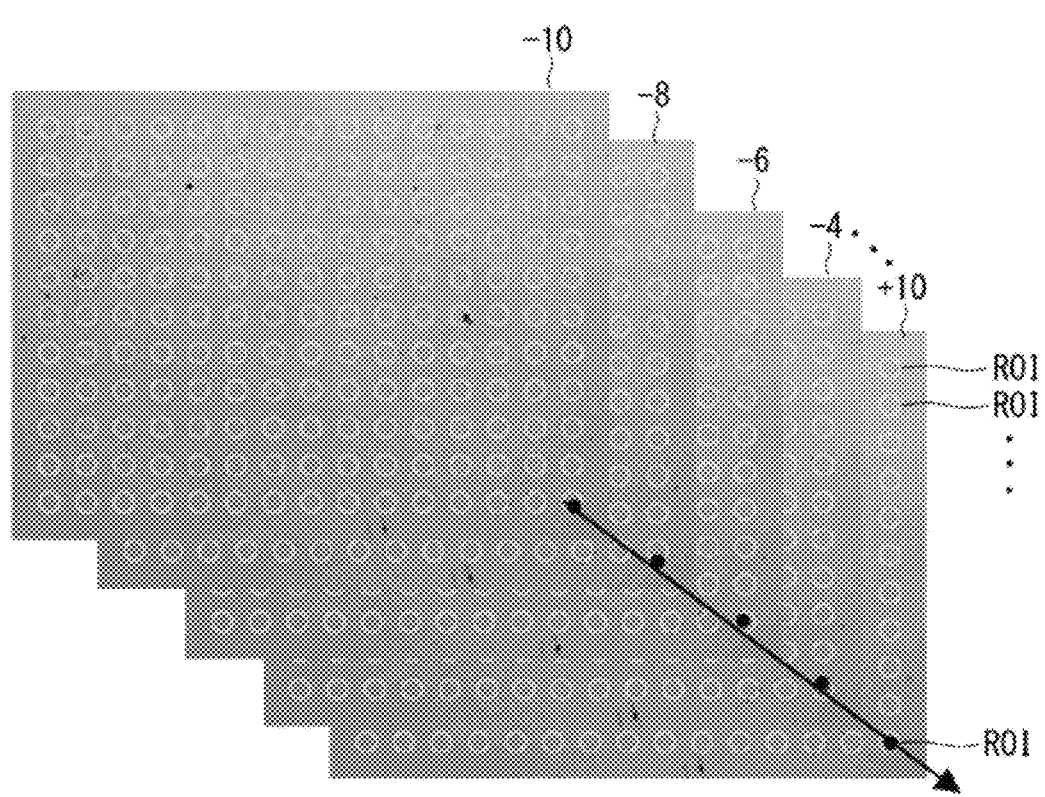
FIG. 11 is a diagram describing an example where through angle of analyzer data of each ROI is converted from a plurality of images obtained by the polarized microscope according to Embodiment 1.

FIG. 11 is a diagram describing an example where through angle of analyzer data of each ROI is converted from a plurality of images obtained by the polarized microscope 1 according to Embodiment 1. As illustrated in FIG. 11, the through angle of analyzer data may be converted from a plurality of images for each ROI. Here, an ROI may not be 1 pixel, and for example, in order to decrease noise, binning may be performed in a rectangular shape (10 pixels×10 pixels) or a circular shape (φ20 pixels). For conciseness of the drawings, some reference numerals are omitted.

Figure 12:
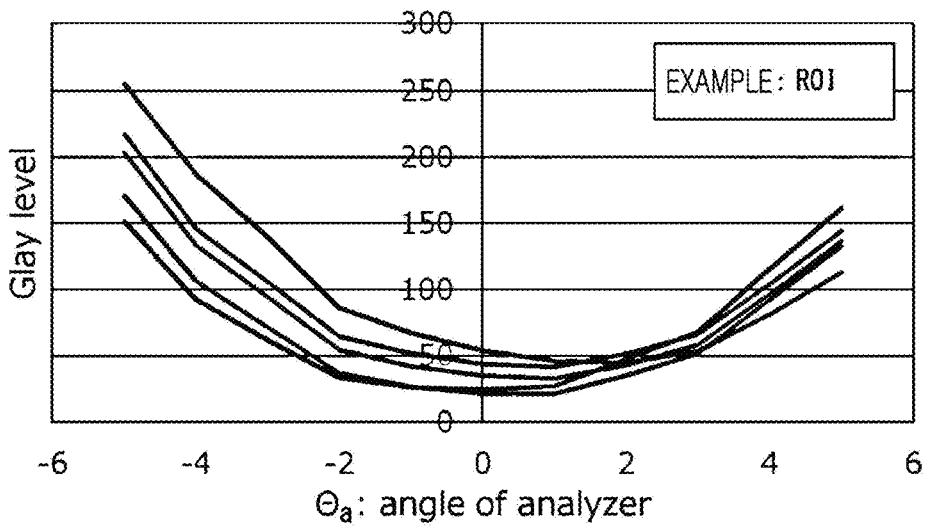
FIG. 12 is a graph showing analyzer transmission angle data obtained by the polarized microscope according to Embodiment 1, a horizontal axis representing an angle of an orientation of an analyzer and a vertical axis representing a brightness value.

FIG. 12 is a graph showing through angle of analyzer data obtained by the polarized microscope 1 according to Embodiment 1, the horizontal axis representing an angle of an orientation of the analyzer 17 and the vertical axis representing an average brightness value (gray level) of each ROI. As illustrated in FIG. 12, as an angle $\Theta_a$ of the orientation of the analyzer 17 is reduced, a brightness value may decrease. However, a position at which a brightness value is minimized or reduced for each ROI may deviate from an angle $\Theta_a=0$ for each ROI. A smallest brightness value angle $\Theta_a$ may be referred to as a polarization rotation angle $\Theta_0$.

Subsequently, the through angle of analyzer data for each ROI may be fitted to a certain function. Although described below, a function used in fitting may be based on Malus law well known in the polarization optical field in operation S15 of FIG. 7.

Figures 13A, 13B, 13C:
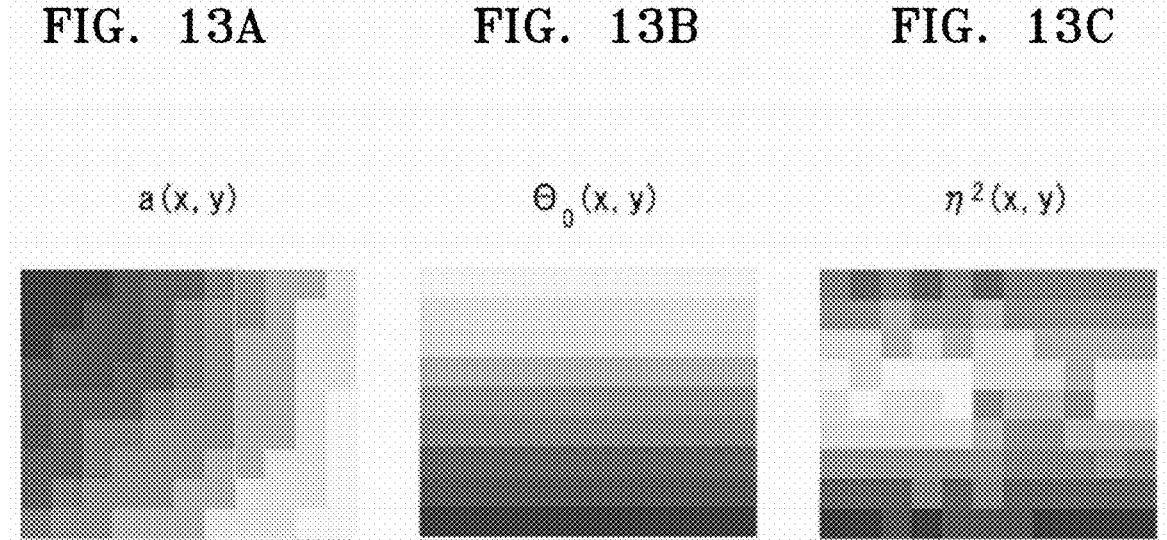
FIGS. 13A to 13C are diagrams a distribution of brightness non-uniformity $a(x, y)$, a distribution of a polarization rotation angle $\Theta_0(x, y)$, and a distribution of the square $\eta^2(x, y)$ of ellipticity $\eta$, in the polarized microscope according to Embodiment 1.

FIGS. 13A to 13C are diagrams a distribution of brightness non-uniformity a(x, y), a distribution of a polarization rotation angle $\Theta_0$(x, y), and a distribution of the square $\eta^2$(x, y) of ellipticity in the polarized microscope according to Embodiment 1. As illustrated in FIG. 13, the through angle of analyzer data for each ROI may be fitted to a certain function, and thus, a distribution of brightness non-uniformity a(x, y), a distribution of a polarization rotation angle $\Theta_0$(x, y), and a distribution of the square $\eta^2$(x, y) of ellipticity $\eta$ may be calculated for each ROI in operation S16 of FIG. 7. In the following descriptions, a distribution of brightness non-uniformity a(x, y), a distribution of a polarization rotation angle $\Theta_0$(x, y), and a distribution of the square $\eta^2$(x, y) of ellipticity $\eta$ for each ROI may be referred to as a device function or a device integer.

As described above, the image processor 30 may obtain a plurality of images by irradiating the illumination light 21 onto the sample 20 which is non-magnetic or onto the sample 20 which includes a magnetic material, and to which a magnetic field is not applied and which is used as a non-magnetic specular sample, while rotating an angle between an orientation of the polarizer 12 and an orientation of the analyzer 17 at a certain interval within a certain range. Also, the image processor 30 may calculate a device integer, including a distribution of brightness non-uniformity, a distribution of a polarization rotation angle, and a distribution of the square of ellipticity based on ellipticity for each ROI of an intra image field including a plurality of ROIs, from a plurality of obtained images.

In this case, the analyzer 17 may rotate the polarizer 12 within a certain range, based on cross Nicole disposition. Also, the image processor 30 may calculate a device integer (a device function) for each ROI by using Malus law. Also, an azimuth of the analyzer 17 may be fixed, and data may be obtained by rotating the polarizer 12 within a certain range.

<(ii) Obtainment of Image Based on Magnetic Field Sweeping and Analysis of Each ROI>

Hereinafter, obtainment of image based on magnetic field sweeping and analysis of each ROI will be described. First, the sample 20 including a magnetic material to be evaluated may be placed on the stage 15 in operation S21 of FIG. 8. The sample 20 may include, for example, a wafer where a magnetic thin film is formed.

Subsequently, the polarizer 12 and the analyzer 17 may be set to a zero point through adjustment based on cross Nicole disposition in operation S22 of FIG. 8. Subsequently, an angle $\Theta_a$ of an orientation of the analyzer 17 may be set to some angles $\beta_1$ within an angle range of calibration described above in operation S23 of FIG. 8. The angle $\beta_1$ may use, for example, about 5 degrees.

Subsequently, an image may be obtained while sweeping a magnetic field by about ±10 times coercivity Hc(x, y) (a level reaching saturation magnetization) of the sample 20 evaluated in operation S24 of FIG. 8. At this time, an image may be obtained with sufficient time resolution. When the magnet 16 is an electromagnet, a control value of a magnetic field and an imaging time of the image obtainer 19 may be connected to a timestamp. In an interval for image obtainment, an exposure time, a frame rate, and a magnetic field sweeping time per one image may be set so that some measurement points are in a rising/falling slope.

Figure 14A:
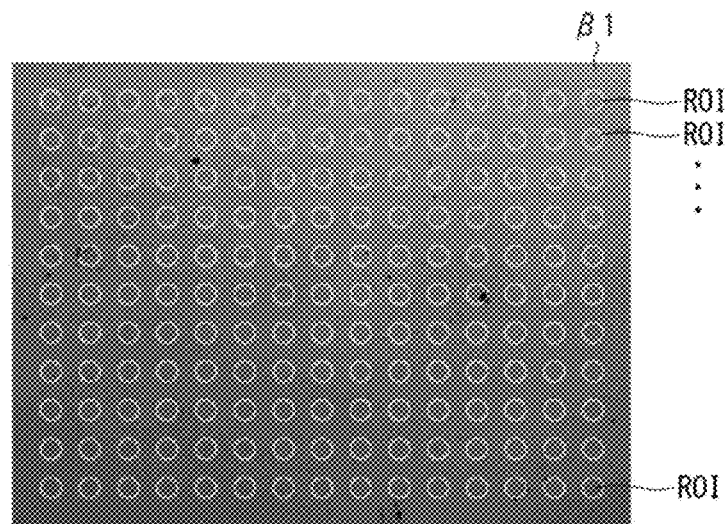
FIG. 14A is a diagram showing an image including a plurality of ROIs obtained by the polarized microscope according to Embodiment 1.
Figure 14B:
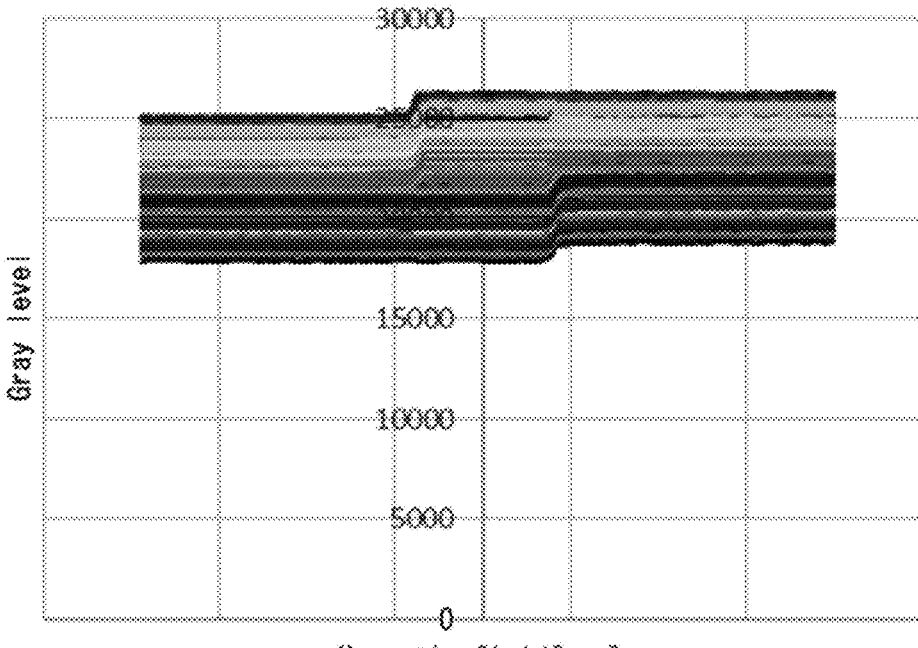
FIG. 14B is a graph showing a hysteresis loop of each ROI extracted from an image obtained by the polarized microscope according to Embodiment 1, a horizontal axis representing an external magnetic field and a vertical axis representing a brightness value.

FIG. 14A is a diagram illustrating an image including a plurality of ROIs obtained by the polarized microscope 1 according to Embodiment 1. FIG. 14B is a graph showing a hysteresis loop of each ROI extracted from an image obtained by the polarized microscope 1 according to Embodiment 1, the horizontal axis representing an external magnetic field and the vertical axis representing a brightness value. As illustrated in FIGS. 11A and 11B, an arithmetic operation may be performed on a magnetic field sweeping data (through magnetic field) group of data where a magnetic field is swept in operation S25 of FIG. 8. Pixel binning processing of an ROI and ROI coordinates may be aligned based on calibration. In an operation-processed data group, a magnetic field may be plotted onto the horizontal axis and a brightness value may be plotted onto the vertical axis, and thus, as illustrated in FIG. 14B, an uncorrected hysteresis loop may be obtained for each ROI.

Figure 15:
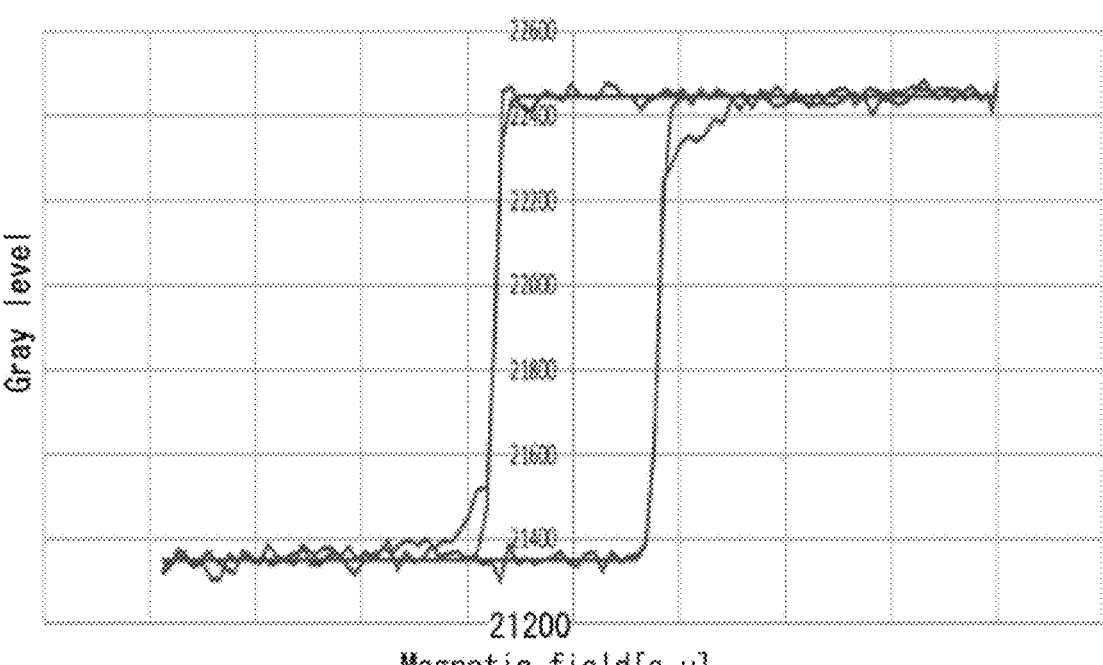
FIG. 15 is a graph showing a fitting function and a hysteresis loop obtained by the polarized microscope according to Embodiment 1, a horizontal axis representing an external magnetic field and a vertical axis representing a brightness value.

Subsequently, a hysteresis loop of each ROI may be fitted to an approximation function. FIG. 15 is a graph showing a hysteresis loop measurement value obtained by the polarized microscope 1 according to Embodiment 1 and a fitting function curve thereof, the horizontal axis representing an external magnetic field and the vertical axis representing a brightness value. As illustrated in FIG. 15, the obtained hysteresis loop of each ROI may be fitted to an approximation function. The approximation function may be an empirical function. The approximation function may not be a physical model.

FIG. 16 is a diagram illustrating an equation used in an intra image field correction analysis method according to Embodiment 1. As illustrated in FIG. 16, in the present example embodiment, in the following Equation (0), a hysteresis loop of each ROI illustrated in FIGS. 14 and 15 may be fitted.

$$I=D+R \tan h(\alpha(H\pm H_c)) \tag{0}$$

Based on the fitting, an intra image field map of a magnetization indicator such as a contrast C(x, y), a coercivity Hc(x, y), and a slope $\alpha$(x, y) may be obtained from a shape of the hysteresis loop for each ROI in operation S26 of FIG. 8.

Figure 17:
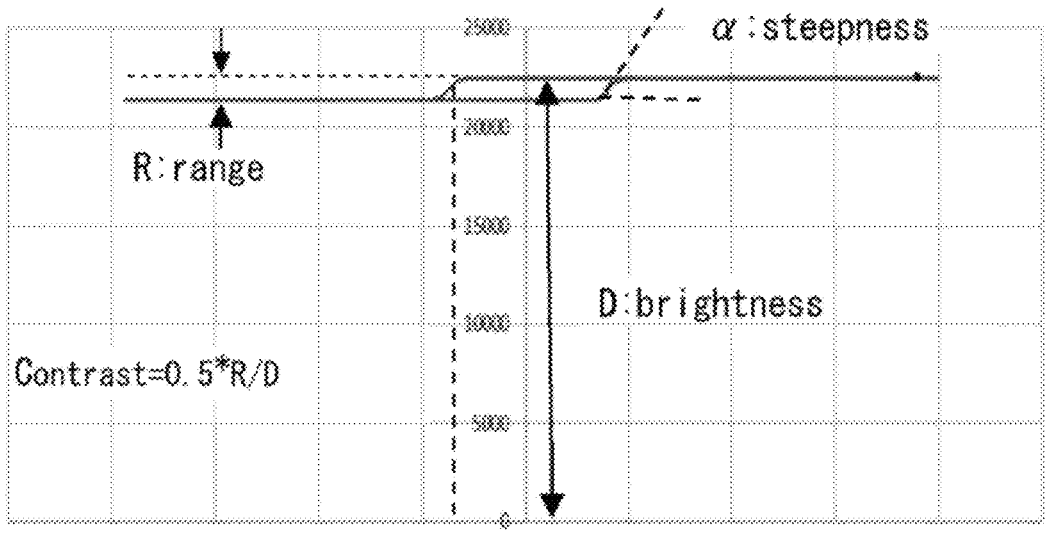
FIG. 17 is a graph showing a contrast $C(x, y)$, a coercivity $Hc(x, y)$, and a slope $\alpha(x, y)$ each obtained by the polarized microscope according to Embodiment 1.
Figure 18:
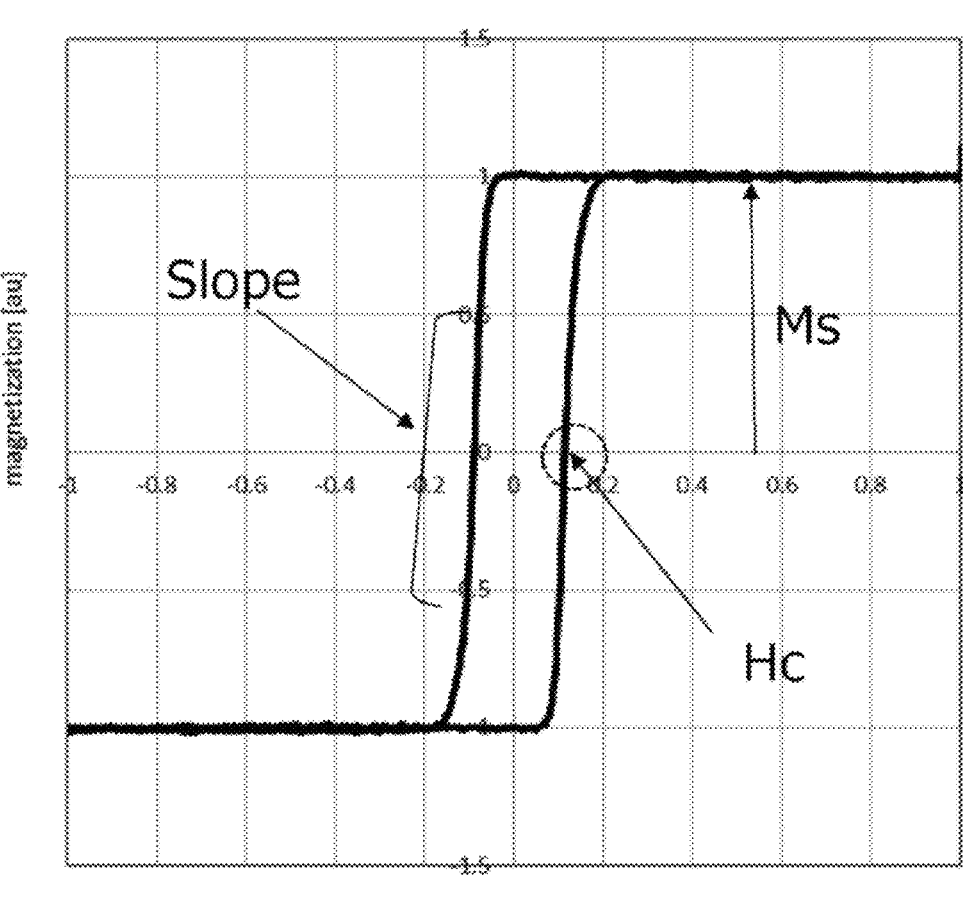
FIG. 18 is a graph showing definition of each of a contrast $C(x, y)$, a coercivity $Hc(x, y)$, and a slope $\alpha(x, y)$ each obtained by the polarized microscope according to Embodiment 1.

FIGS. 17 and 18 are graphs showing definitions of a contrast C(x, y), a coercivity Hc(x, y), and a slope $\alpha$(x, y) each obtained by the polarized microscope 1 according to Embodiment 1. As illustrated in FIG. 17, the contrast C(x, y) may be calculated from a range R and brightness D of when Equation (0) is fitted to a hysteresis loop, based on a contrast C=0.5*(R/D). Here, the range R may denote a difference between a brightness value corresponding to a positive saturation magnetization state and a brightness value corresponding to a negative saturation magnetization state. The brightness D may denote an average brightness value of the brightness value corresponding to the positive saturation magnetization state and the brightness value corresponding to the negative saturation magnetization state.

The coercivity Hc(x, y), as illustrated in FIGS. 17 and 18, may be calculated from an intersection point between the hysteresis loop and two saturation magnetization intermediate values of the hysteresis loop. The slope $\alpha$(x, y), as illustrated in FIGS. 17 and 18, may be calculated from a rising slope of the hysteresis loop. Also, a slope may be referred to as steepness.

As described above, in (ii) of the present example embodiment, when an angle between an orientation of the polarizer 12 and an orientation of the analyzer 17 is set to an angle $\beta_1$, the image processor 30 may irradiate the illumination light 21 and sweep an external magnetic field to obtain a plurality of images, with respect to a magnetic material portion of the sample 20 including a magnetic material. Also, the image obtainer 30 may obtain a hysteresis loop corresponding to a brightness value of each ROI, from the obtained plurality of images. The image processor 30 may fit the hysteresis loop to an empirical approximation function for each ROI (x, y) to calculate a contrast C(x, y), a coercivity Hc(x, y), and a slope $\alpha(x, y)$ of each ROI (x, y). In an angle $\beta_1$ of the orientation of the analyzer 17, a contrast C(x, y), a coercivity Hc(x, y), and a slope $\alpha(x, y)$ may be respectively referred to as a contrast $C_1(x, y)$, a coercivity $H_{c1}(x, y)$, and a slope $\alpha_1(x, y)$.

Subsequently, an angle $\Theta_a$ of the orientation of the analyzer 17 may be set to an angle $\beta_2$ which differs from the angle $\beta_1$ in operation S27. The angle $\beta_2$ may be an angle within an angle range of calibration described above. For example, although $\beta_2=-\beta_1$, an angle is not limited when the angle is within an angle range of calibration. Subsequently, like the angle $\beta_1$, an image may be obtained while sweeping a magnetic field by about ±10 times coercivity Hc(x, y) of the sample 20 evaluated in operation S28 of FIG. 8. In this case, image obtainment manipulation such as obtaining an image with sufficient time resolution may be performed like the angle $\beta_1$. Also, an arithmetic operation may be performed on a magnetic field sweeping data group for each ROI in the obtained image in operation S29 of FIG. 8. Also, a hysteresis loop of each ROI may be fitted to an empirical approximation function, and thus, a contrast C(x, y), a coercivity Hc(x, y), and a slope $\alpha(x, y)$ of each ROI may be obtained in operation S30 of FIG. 8.

As described above, in (ii) of the present example embodiment, when an angle between an orientation of the polarizer 12 and an orientation of the analyzer 17 is set to an angle $\beta_2$, a plurality of images may be obtained while irradiating the illumination light 21 and sweeping an external magnetic field, with respect to a magnetic material portion of the sample 20 including a magnetic material. Also, the image obtainer 30 may obtain a hysteresis loop corresponding to a brightness value of each ROI, from the obtained plurality of images. The image processor 30 may fit the hysteresis loop to an empirical approximation function for each ROI (x, y) to calculate a contrast C(x, y), a coercivity Hc(x, y), and a slope $\alpha(x, y)$ of each ROI (x, y). In an angle $\beta_2$ of the orientation of the analyzer 17, a contrast C(x, y), a coercivity Hc(x, y), and a slope $\alpha(x, y)$ may be respectively referred to as a contrast $C_2(x, y)$, a coercivity $H_{c2}(x, y)$, and a slope $\alpha_2(x, y)$.

The contrast C(x, y), the coercivity Hc(x, y), and the slope $\alpha(x, y)$ may represent a feature shape of the hysteresis loop. For example, all of the contrast C(x, y), the coercivity Hc(x, y), and the slope $\alpha(x, y)$ may be indicators associated with a final performance (an operation speed, power consumption, and reliability) of an MRAM device. Furthermore, in addition to three indicators, other indicators may be defined. Based on analysis by the inventor, the coercivity Hc(x, y) which is an indicator of an external magnetic field where magnetization reversal occurs may obtain a result which is almost similar to that of spot measurement without correction. However, saturation magnetization $M_s(x, y)$ may be a characteristic correlated with a magnetization contrast, but like the description of the comparative example given above with reference to FIGS. 3 and 4, correction may be needed or desired because a difference with spot measurement is large. Also, the slope $\alpha(x, y)$ may be an indicator where the coercivity Hc(x, y) and the saturation magnetization $M_s(x, y)$ are mixed and may need to be corrected.

<(iii) Correction Processing Using Measurement Data and Physical Model>

Subsequently, a rotation angle $\Delta\Theta(x, y)$ of an orientation rotation may be calculated for each ROI(x, y) by using a physical model in operation S31 of FIG. 9. In detail, the image processor 30 may calculate a rotation angle $\Delta\Theta(x, y)$ of a Kerr rotation for each ROI, based on analysis using a hysteresis loop corresponding to a device integer and the angle $\beta_1$ and a hysteresis loop corresponding to the angle $\beta_2$. The physical model may be expressed in Equations (1) and (2) in FIG. 16. Also, as expressed in the following Equations (1) and (2), Equation (1) may be divided into Equations (1-1) to (1-4).

$$2\Delta\Theta(x,y)=(P1-P2)/P3 \tag{1-1}$$

$$P1=C_2(x, \quad y) \quad \{(1-2\eta^2(x, \quad y)) \quad \sin^2(\beta_2-\Theta(x, \quad y))+ \\ \eta^2(x, y)\} \tag{1-2}$$

$$P2=AC_1(x, y)\{(1-2\eta^2(x, y)) \sin^2(\beta_1\Theta(x, y))+\eta^2(x, y)\} \tag{1-3}$$

$$P3=(1-2\eta^2(x, \quad y))\{\sin(2(\beta_2-\Theta(x, \quad y))-A \quad \sin(2(\beta_1 \\ -\Theta(x, y))\} \tag{1-4}$$

Here, A of Equations (1), (1-3), and (1-4) may be expressed as the following Equation (2).

$$A=\{1+\cos(2(\beta_1-\Theta(x, y))\}/\{1+\cos(2(\beta_2-\Theta(x, y))\} \tag{2}$$

Descriptions and calculations of Equations (1) and (2) may be given in some example embodiments. In (ii), the orientation of the analyzer 17 may be set to at least two angles $\beta_1$ and $\beta_2$, and an image may be captured while sweeping a magnetic field. Also, by analyzing a hysteresis loop for each ROI of the image, values of two contrasts $C_1(x, y)$ and $C_2(x, y)$ may be calculated for each ROI.

Therefore, the image processor 30 may substitute a calibration result of a device integer in (ii) described above, set values of the angles $\beta_1$ and $\beta_2$ of the orientation of the analyzer 17, and the contrasts $C_1(x, y)$ and $C_2(x, y)$ in (ii) into the physical model equations (1) and (2), and thus, the image processor 30 may obtain a measurement value of a rotation angle $\Delta\Theta(x, y)$ of a corrected Kerr rotation.

In Equations (1) and (2), in <(i) pre-calibration> and <(ii) image obtainment based on sweeping a magnetic field and analysis for each ROI>, a measured value and a set angle may be $\beta_1$ and $\beta_2$. Accordingly, a rotation angle $\Delta\Theta(x, y)$ of a Kerr rotation occurring in the sample 20 in ROI(x, y) may be a corrected quantitative value.

<Propagation to a Kerr Rotation of a Polarization Error Occurring in a Polarized Microscope>

Hereinafter, an example will be described where a polarization error (a device integer) occurring in a polarized microscope is error-propagated based on a Kerr rotation caused by the sample 20, based on the object.

First, a case where an external magnetic field is not applied to the sample 20 may be considered. Also, ROI(x, y) may be considered to be arbitrary 1 coordinates. In ideal cross Nicole disposition, the orientation of the polarizer 12 may be an X-axis direction, and the orientation of the analyzer 17 may be a Y-axis direction. In this case, rectilinear polarized light which passes through the polarizer 12 and has an amplitude in the X-axis direction may pass through an optical system of the polarized microscope 1, and a polarization surface may $\Theta$-rotate and simultaneously or contemporaneously may have an elliptical based on an ellipticity $\eta$.

Figure 19:
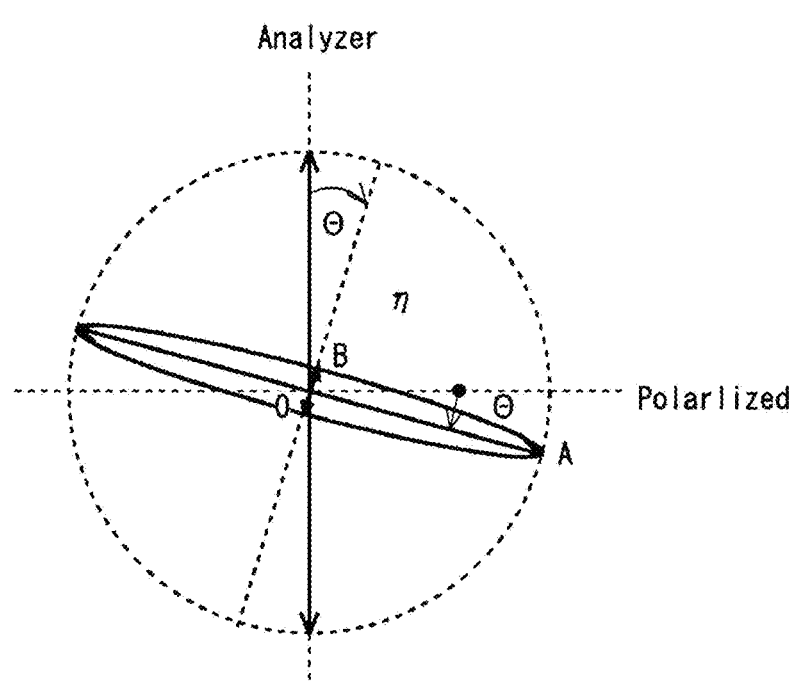
FIG. 19 is a diagram illustrating an ellipticity and a rotation of a polarization surface when an external magnetic field is not applied, in the polarized microscope according to Embodiment 1.

FIG. 19 is a diagram illustrating an ellipticity and a rotation of a polarization surface when an external magnetic field is not applied, in the polarized microscope 1 according to Embodiment 1. An azimuth of incident rectilinear polarized light may be an X axis, and an azimuth of an analyzer may be a Y axis. As illustrated in FIG. 19, a polarization azimuth OA of the reflected light 22 may pass through the polarized microscope 1, and thus, Θ rotation and ellipticity (an ellipse long axis OA and an ellipse short axis OB) may be performed thereon.

The Θ rotation and ellipticity may be caused by an amplitude difference (ellipticity) between s-polarized light and p-polarized light, occurring due to a curvature of the objective lens 14, an anti-reflection film, and coating of the beam splitter 13, and a phase difference (a rotation of a polarization surface) between the s-polarized light and the p-polarized light. The image obtainer 19 may detect a sum of projection components onto a Y axis of OA and a Y axis of OB. Also, image positions may differ in light path until light reaches coordinates (image position) of an imaging device of the image obtainer 19, and thus, the amount of change in polarized light may vary based on an image position.

Figure 20:
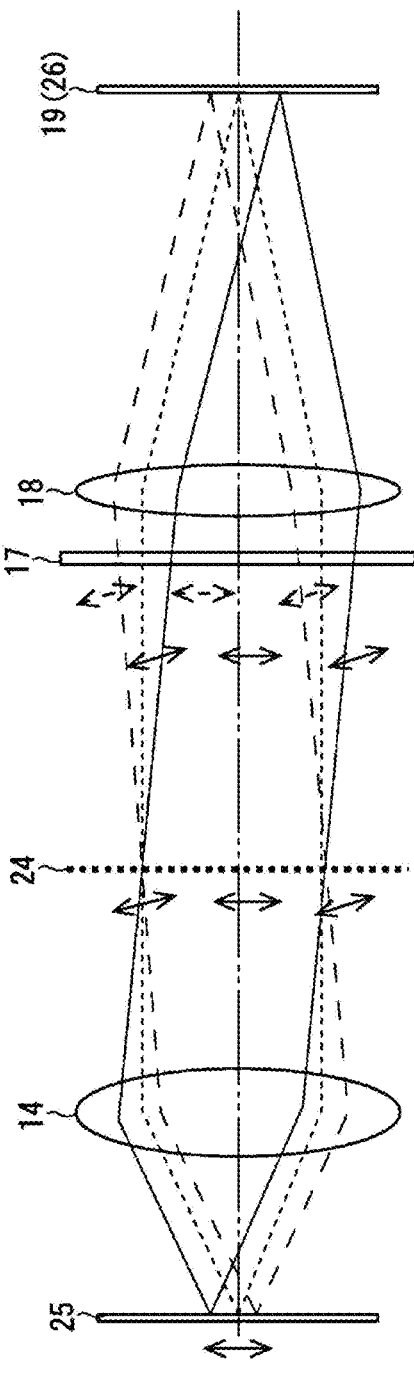
FIG. 20 is a diagram illustrating a light path until reflected light reflected by a sample reaches an imaging surface of an image obtainer, in a state where a beam splitter is not provided.
Figure 21:
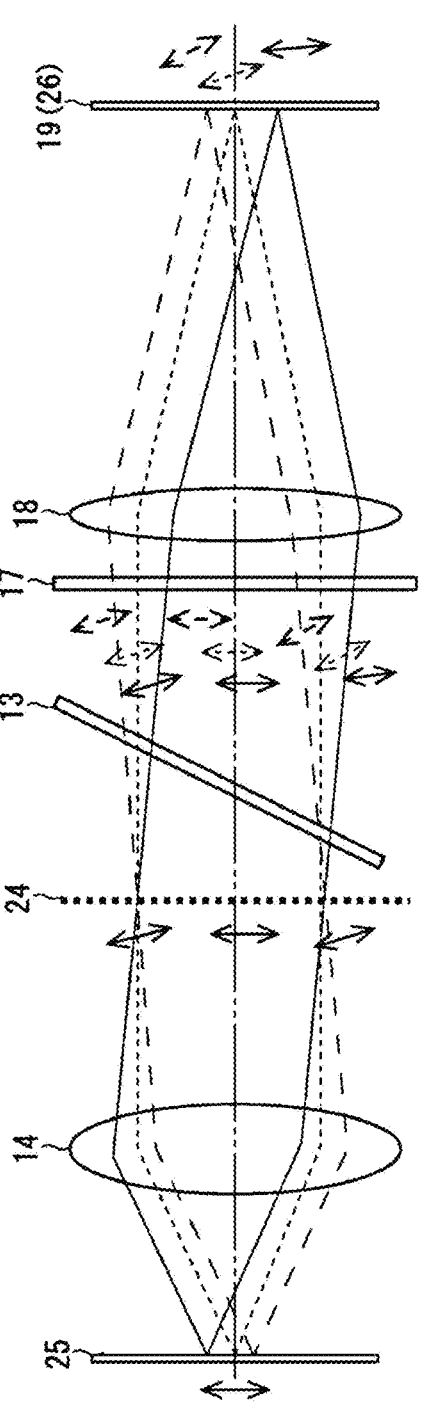
FIG. 21 is a diagram illustrating a light path until reflected light reflected by a sample reaches an imaging surface of an image obtainer, in a state where a beam splitter is provided.

FIG. 20 is a diagram illustrating a light path until the reflected light 22 reflected by the sample 20 reaches an imaging surface 26 of the image obtainer 19, in a state where the beam splitter 13 is not provided. FIG. 21 is a diagram illustrating a light path until the reflected light 22 reflected by the sample 20 reaches an imaging surface 26 of the image obtainer 19, in a state where the beam splitter 13 is provided. As illustrated in FIGS. 20 and 21, when the beam splitter 13 is provided, a light path until the reflected light 22 reaches the imaging surface 26 of the image obtainer 19 may be changed based on positions. Also, it is illustrated that angles at which three beams are incident on the beam splitter 13 differ based on a position of an object (a position of a sample). The beam splitter 13 may control a reflectance and a transmittance by using a dielectric multilayer generally, but may not depend on polarization.

Accordingly, the degrees of rotation and ellipticity of a polarization surface may be changed based on an angle difference. The dielectric multilayer of the beam splitter 13 may be provided for example, but anti-reflection coating of each surface of an objective lens configuring a light path may be provided for example and a change in polarization component in a whole light path reaching an image position may be changed based on an image position. Accordingly, the degree of change in orientation may be changed based on an image position. This may be inevitable despite a degree difference.

When energy is $OA^2+OB^2=1$, projection components OA and OB onto the analyzer 17 may respectively be $\sqrt{(1-\eta^2)}$ sin Θ and $\eta\cos\eta$. Such components may be non-interference because vibration surfaces perpendicular to each other are provided. Therefore, a strength of light passing through the analyzer 17 may be $(1-\eta^2)\sin^2\Theta+\eta^2\cos^2\Theta$, and based on deformation, the following Equation (3) of FIG. 16 may be obtained.

$$I(\Theta,\eta)=(1-2\eta^2)\sin^2\Theta+\eta^2 \qquad (3)$$

Equation (3) has been known as Malus law representing a strength of light passing through the analyzer 17. Therefore, in (i) calibration described above, when the image obtainer 19 records a brightness value while shaking an angle $\Theta_a$ of the analyzer 17, the following Equation (4) of FIG. 16 may be derived.

$$I(\Theta,\eta)=a[(1-2\eta^2)\sin^2(\Theta_a-\Theta)+\eta^2] \qquad (4)$$

Here, I, a, $\eta^2$, and Θ may have values which are changed based on a position (x, y) of an intra image field. That is, I(x, y) may be provided. Hereinafter, (x, y) may be omitted. Also, I(Θ,ηn) may be expressed. Here, a may be a coefficient for total energy 1 and may correspond to brightness non-uniformity. A ratio of DC component $\eta^2$ to an amplitude $1-2\eta^2$ of $\sin^2$ may be $\eta^2/(1-2\eta^2)$ and may correspond to a light strength ratio. In (i) pre-calibration, based on verification by the inventor, an experiment curve may differ in each ROI of an intra image field. As described above, each of a(x, y), $\eta^2(x, y)$, and $\Theta(x, y)$ may be obtained as a device integer from fitting based on Equation (4) for each ROI. In a test by the inventor, an intra image field difference a(x, y) may be about ±10%, $\eta^2(x, y)$ may be about ±20%, and $\Theta(x, y)$ may be about ±0.5 degrees (see FIG. 13). Also, an absolute value of each of $\Theta(x, y)$ and $\eta^2(x, y)$ may be a positive integer which is one or more digit numbers greater than a Kerr rotation and Kerr ellipticity occurring in a magnetic thin film of a measurement target.

Figure 22:
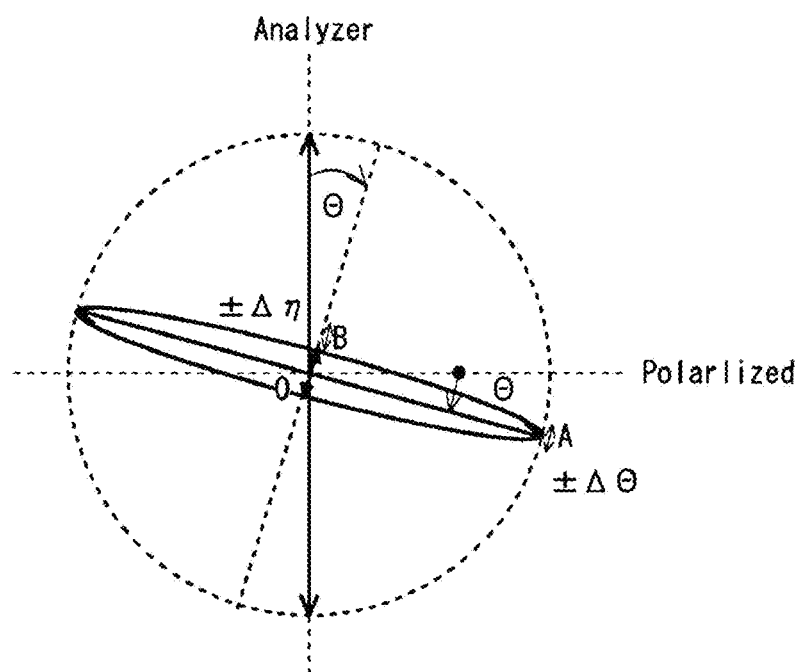
FIG. 22 is a diagram illustrating a rotation and ellipticity of a polarization surface when an external magnetic field is applied, in the polarized microscope according to Embodiment 1.

The following descriptions will be given under a condition where a fine Kerr rotation and Kerr ellipticity are provided in the sample 20 including a magnetic material such as a magnetic thin film when an external magnetic field is swept. FIG. 22 is a diagram illustrating a rotation and ellipticity of a polarization surface when an external magnetic field is applied, in the polarized microscope 1 according to Embodiment 1. As illustrated in FIG. 22, a Kerr rotation may be modulated into ±ΔΘ with respect to Θ, and an ellipticity may be modulated into ±Δη with respect to η. This may be satisfied based on a ±saturation magnetic field in sweeping of an external magnetic field.

A device integer may be expressed as the following Equation (5) of FIG. 16, like (i) pre-calibration.

$$I\pm=a[(1-2(\eta\pm\Delta\eta)^2)\sin^2(\Theta_a-(\Theta\pm\Delta\Theta))+(\eta\pm\Delta\eta)^2] \qquad (5)$$

Because ΔΘ≪0 and Δη≪η, approximation and equation deformation may be performed, and for conciseness, $\Theta_a-\Theta=\Theta$ may be expressed and a may be omitted. Therefore, the following Equation (6) of FIG. 16 may be derived.

$$I\pm\approx[(1-2(\eta^2\pm2\eta\Delta\eta)^2)\sin^2(\Theta\pm\Delta\Theta)]+\eta^2\pm2\eta\Delta\eta] \qquad (6)$$

An indicator for quantitative evaluation may be $\Delta I=I_+-I_-$, and thus, may be expressed as ΔI in the following Equation (7).

$$\Delta I=(1-2\eta^2+4\eta\Delta\eta)\sin(2\Theta)\sin(2\Delta\Theta)+4\eta\Delta\eta(1+\cos(2(\Theta+\Delta\Theta))) \qquad (7)$$

In Δθ and Δη of Equation (7), the device integer may be provided as a coefficient, and thus, division may not be impossible. Also, an undetermined coefficient may be provided as two coefficients (ΔΘ and Δη), and thus, it may be impossible to derive coefficients through measurement performed once.

Therefore, in a means for simply changing a state, it may be assumed that measurement is performed twice under a condition where an angle β of the analyzer 17 is provided at 2 levels ($\Theta_1=\beta_1-\Theta$ and $\Theta_2=\beta_2-\Theta$). However, up to Equation (7), non-dimensional light strength may be provided, but an actually recorded value may be a pixel value (brightness value: gray level) of the imaging device of the image obtainer 19. Therefore, a non-dimensional contrast value may be introduced by dividing Equation (7) by Equation (4). In this case, a of Equation (4) may be in Equation (7), and thus, may be offset. That is, a contrast C may be defined in the following Equations (8-1) to (8-4) and Equation (8) of FIG. 16.

$$C=(Q1+Q2)/Q3 \tag{8-1}$$

$$Q1=(1-2\eta^2+4\eta\Delta\eta)\sin(2\Theta)\sin(2\Delta\Theta)) \tag{8-2}$$

$$Q2=4\eta\Delta\eta(1+\cos(2(\Theta+\Delta\Theta))) \tag{8-3}$$

$$Q3=[(1-2\eta^2)\sin^2(\Theta)+\eta^2] \tag{8-4}$$

In real measurement data, this may correspond to a height difference (brightness difference)/average value of a hysteresis loop in sweeping an external magnetic field. The contrast C may be a contrast in FIG. 17. A contrast derived from a hysteresis loop in 2 levels of the analyzer 17 may be provided as a contrast $C_1$ and a contrast $C_2$, and when $\Delta\Theta$ is calculated by removing $\Delta\eta$ from simultaneous or contemporaneous equations of two Equations (8), the following Equations (9-1) to (9-4) and Equation (9) of FIG. 16 may be derived.

$$U1=U2 \tag{9-1}$$

$$U1=(1-2\eta^2)(C_2\sin^2\Theta_2-C_1\sin^2\Theta_1)+\eta^2(C_2-C_1) \tag{9-2}$$

$$U2=(1-2\eta^2)[\sin(2\Theta_2)\sin(2\Delta\Theta)-\sin(2\Theta_1)\sin(2\Delta\Theta)\cdot U3] \tag{9-3}$$

$$U3=(1+\cos(2\Theta_2)\cos(2\Delta\Theta))/(1+\cos(2\Theta_1)\cos(2\Delta\Theta)) \tag{9-4}$$

Here, $\Delta\Theta$ may be a sufficiently small amount, and thus, an equation may be modified through approximation to $\sin(2\Delta\Theta)\approx2\Delta\Theta$ and $\cos(2\Delta\Theta)\approx1$. Therefore, Equations (1) and (2) of FIG. 16 may be obtained.

Also, $\Delta\eta(x, y)$ may be derived as expressed in the following Equations (10-1) to (10-4) and Equation (10) of FIG. 16.

$$2\Delta\eta(x, y)=(V1-V2)/V3 \tag{10-1}$$

$$V1=C_1\{(1-2\eta^2(x, y))\sin^2(\beta_1-\Theta(x, y))+\eta^2(x, y)\} \tag{10-2}$$

$$V2=(1-2\eta^2(x, y))\sin(2(\beta_1-\Theta0(x, y))\times2\Delta\Theta(x, y) \tag{10-3}$$

$$V3=2\eta(x, y)\{1+\cos(2(\beta_1-\Theta(x, y)))\} \tag{10-4}$$

However, the identification of a sign of $\eta(x, y)$ in a denominator may be needed. This may need separate measurement using $\eta/4$ wavelength plate. Also, the Equations described above and expression of FIG. 16 may be appropriately changed within a range which does not depart from an object of the inventive concepts. For example, in a case where a fundamental physical phenomenon is expressed, approximation expression such as $\sin\Theta\approx\Theta$ may be used. In detail, in the above descriptions and Equations illustrated in FIG. 16, approximation may not be provided, but even when approximation expression based on the order of a real measurement value and a setting value provided therein is used, a fundamental physical expression may not be changed.

According to some example embodiments, by correcting a difference in an intra image field, a distribution of a polarization characteristic in the intra image field may be measured with the same precision as spot measurement. For example, in patent document 2, a polarized microscope which analyzes a polarization characteristic such as a Kerr rotation angle is described, but an operation of correcting a difference in an intra image field is not described. The polarized microscope 1 according to some example embodiments may considerably reduce a processing time because measurement may be implemented as surface measurement ($\Phi$ may be thousands $\mu$m) with the same precision as spot measurement ($\Phi$ may be tens $\mu$m), based on measurement and correction.

Embodiment 1

Hereinafter, based on pre-calibration in the method according to some example embodiments, an operation of obtaining a device integer actually, an operation of obtaining an image based on sweeping a magnetic field, and a result obtained by analysis performed for each ROI will be described. That is, a magnetization contrast C may be evaluated based on imaging MOKE measured in angles of two orientations $\beta_1$ and $\beta_2$ of the analyzer 17.

Also, a rotation angle of a Kerr rotation in an intra image field may be previously measured based on spot measurement and may be compared with correct answer data. The sample 20 may include a free layer of CoFeB which is generally used in MRAM. In detail, the sample 20 may include a layer which is disposed on upper and lower layers of the free layer of CoFeB and implements vertical magnetic anisotropy and a metal layer which is stacked as a cap layer on an outermost surface layer.

An external magnetic field may be set to a level which sufficiently reaches saturation magnetization, based on 10 or more times a coercivity $H_c$. Also, ROI coordinates of an intra image field of the imaging MOKE may be the same as measurement spot coordinates of spot measurement. Also, spot measurement and a magnetic field sweeping speed (unit: Oe/sec) of the imaging MOKE may be provided in common.

Figure 23A:
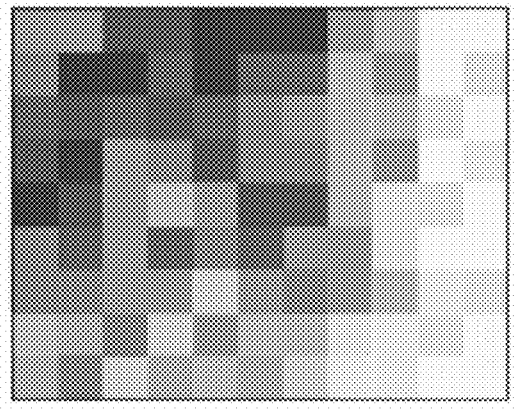
FIG. 23A shows an example where a gray level difference range of a hysteresis loop is normalized to a gray level of an image field center, when an angle of an orientation of an analyzer is set to +4 degrees.

FIG. 23A shows an example where a gray level difference range of a hysteresis loop is normalized to a gray level of an image field center, when an angle of an orientation of the analyzer 17 is set to about +4 degrees. FIG. 23A shows uncorrected raw data. In this case, a space difference of about 9.7% may be provided as $\sigma$/AVE.

Figure 23B:
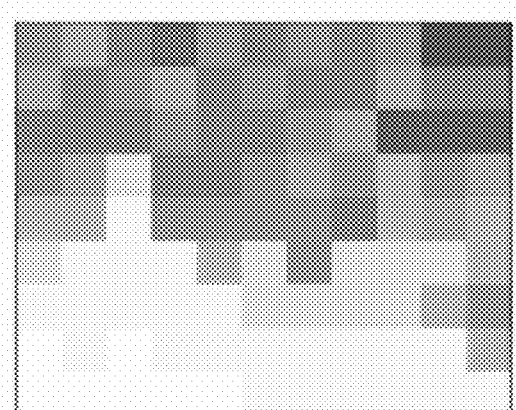
FIG. 23B shows an example where a contrast of a hysteresis loop is simply divided by an average brightness value and thus is normalized based on a value of an image field center.

FIG. 23B shows an example where a contrast of a hysteresis loop is simply divided by an average brightness value and thus is normalized based on a value of an image field center. In this case, a space difference may be about 11.4%, but a difference between raw data of (a) and correct answer data of (d) based on spot measurement may be large.

Figure 23C:
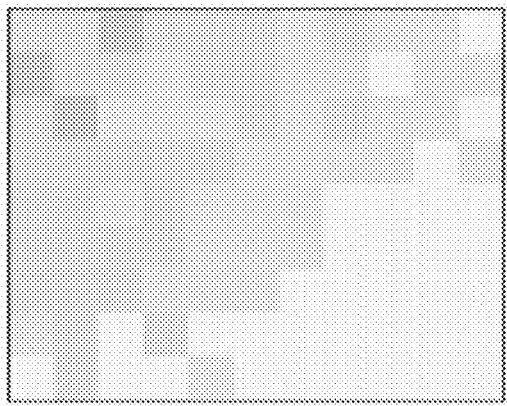
FIG. 23C is a diagram showing a distribution of a magnetization contrast of a sample obtained by the polarized microscope according to Embodiment 1.

FIG. 23C is a diagram showing a distribution of a magnetization contrast of the sample 20 obtained by the polarized microscope according to Embodiment 1. As illustrated in FIG. 23C, in a distribution of contrast according to some example embodiments, an angle of an orientation of the analyzer 17 has been derived from a result of two measurements where 131 is set to about +4 degrees and $\beta_2$ is set to about −4 degrees ($\beta_1$=about +4 degrees and $\beta_2$=about −4 degrees). In this case, a space difference may be about 3.2%.

Figure 23D:
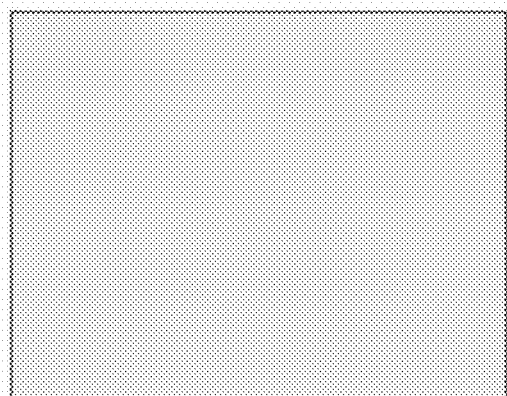
FIG. 23D is a diagram showing a distribution of a magnetization contrast obtained by a spot meter.

It may be seen that a shape, which is in a fingerprint caused by a device integer in FIGS. 23A and 23B and is not in a correct answer distribution in FIG. 23D, is easily removed.

FIG. 23D is a diagram showing a distribution of a magnetization contrast obtained by a spot meter.

As illustrated in FIG. 23D, in a result based on spot measurement, there is not a feature shape caused by the device integer because a difference is reduced.

Figures 24A, 24B, 24C, 24D, 24E, 24F:
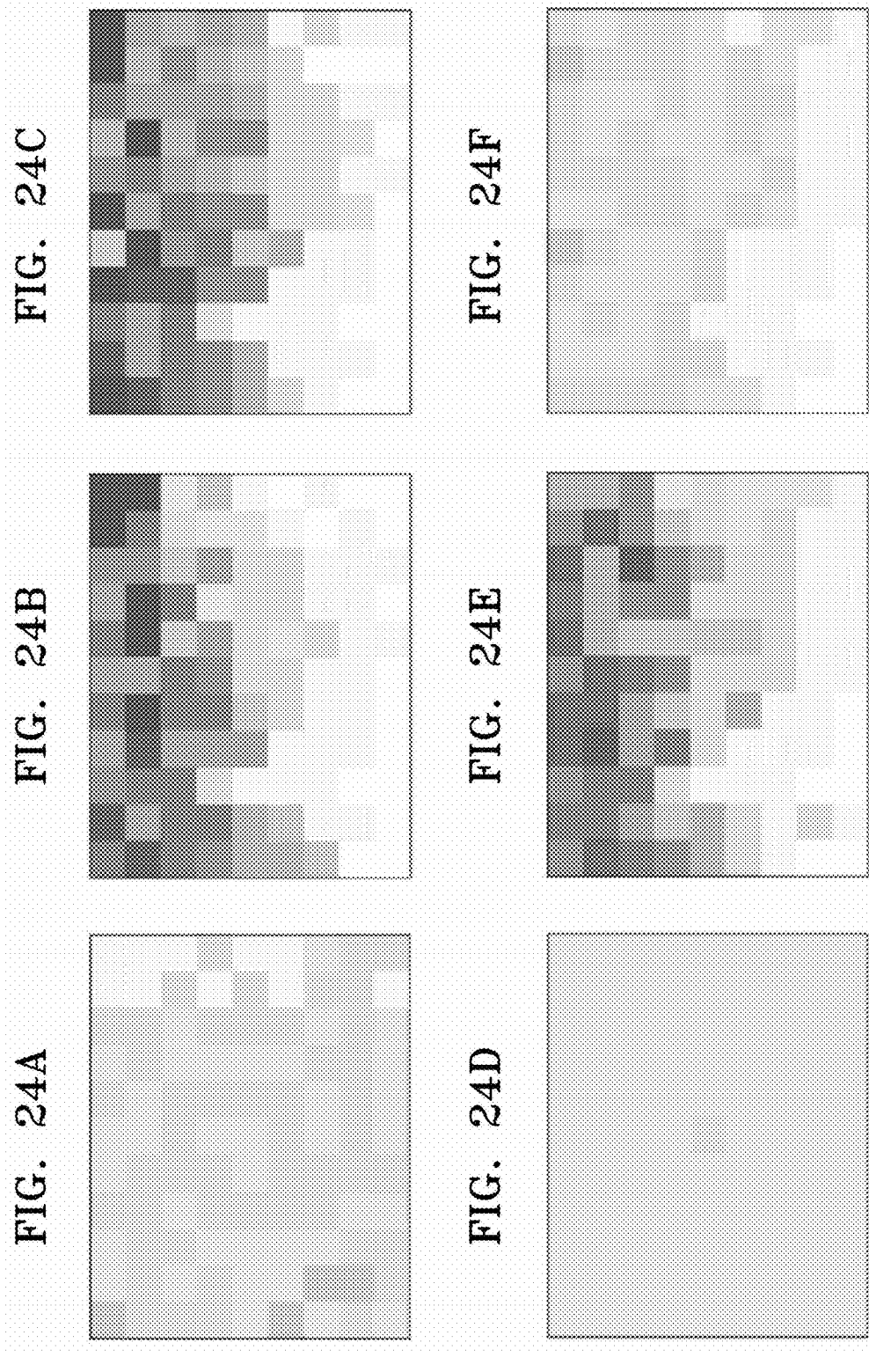
FIGS. 24A to 24C are diagrams showing a result of quantitative analysis of the polarized microscope according to Embodiment 1.
FIGS. 24D to 24F are diagrams showing a result of spot measurement.

FIGS. 24A to 24C are diagrams showing a result of quantitative analysis of the polarized microscope 1 according to Embodiment 1, and FIGS. 24D to 24F are diagrams showing a result of spot measurement. In FIGS. 24A to 24C, distributions of saturation magnetization $M_s(\propto\Delta2\Theta)$, a coercivity $H_c$, and a slope $\alpha$ in an intra image field are shown. In FIGS. 24D to 24F, a result obtained by spot measurement performed a plurality times equal to FIGS. 24A to 24C is shown.

As illustrated in FIGS. 24A to 24C, in some example embodiments, all indicators of a hysteresis loop shown in FIG. 18 may be quantitatively analyzed. Also, a numerical value of a distribution of each indicator according to some example embodiments may be multiplied by scaling, but this may be correlated with a distribution based on spot measurement. A coefficient may be managed in the semiconductor manufacturing field, and thus, there is no problem in practical use.

As illustrated in FIG. 24B, in the coercivity $H_c$, scaling in a magnetization direction corresponding to a device integer may not be provided. Therefore, correction may not be needed or desired. As illustrated in FIG. 24C, the slope a may be corrected by multiplying a scaling coefficient in a magnetization direction based on the saturation magnetization $M_s$ by R of an empirical model of Equation (0) of FIG. 16. In detail, a relative distribution $\Delta\Theta'(x, y)$ may be calculated by normalizing $\Delta\Theta(x, y)$ on an intra image field in operation S32 of FIG. 9. Subsequently, the relative distribution may be calculated by normalizing an uncorrected range $R(x, y)$ on a center image field in operation S33 of FIG. 9. Also, a Y-axis correction coefficient of the slope may be calculated for each ROI. A distribution of the slope may be corrected based on $\Delta\Theta'(x, y)/R(x, y)$ Slope$(x, y)$ in operation S34 of FIG. 9.

Hereinafter, an effect of some example embodiments will be described. The polarized microscope 1 according to some example embodiments may measure a polarization characteristic distribution of an intra image field with the same precision as spot measurement, thereby implementing quantitative surface measurement.

Figure 25:
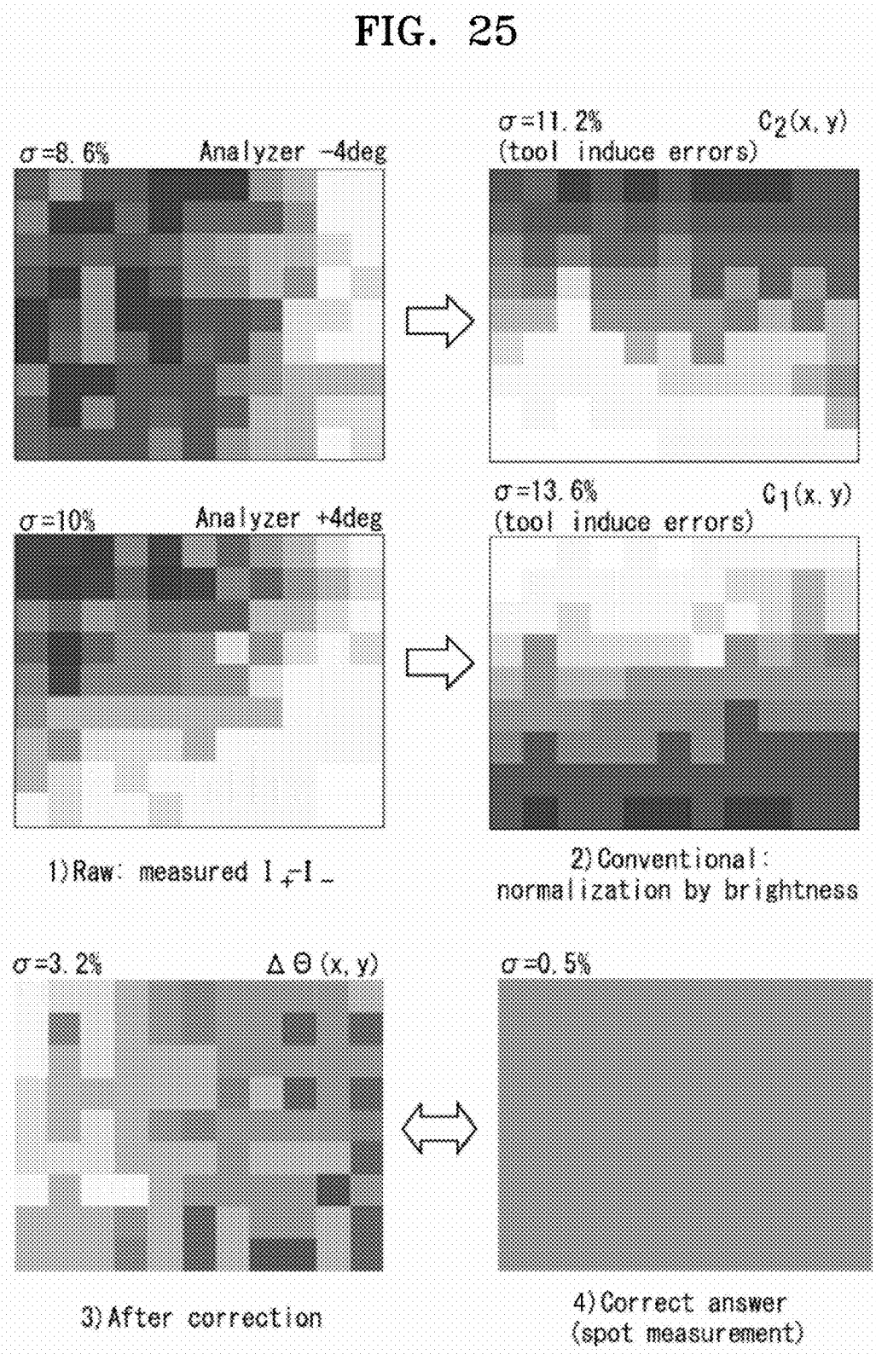
FIG. 25 is a diagram showing a feature of a polarized microscope and an intra image field correction analysis method, according to Embodiment 1.

FIG. 25 is a diagram showing a feature of a polarized microscope and an intra image field correction analysis method, according to Embodiment 1. As illustrated in FIG. 25, for example, the intra image field correction analysis method according to Embodiment 1 may set an angle $\beta$ of an orientation of the analyzer 17 to −4 degrees and +4 degrees, and thus, may obtain a gray level difference range image (raw data) when an external magnetic field is swept on the sample 20. In this case, raw data may have a difference "$\sigma$=about 8.6% and $\sigma$=about 10%". Contrasts $C_1(x, y)$ and $C_2(x, y)$ may be obtained by normalizing each data, but an error caused by a device may be included in each contrast. The contrasts $C_1(x, y)$ and $C_2(x, y)$ may be a correction result (normalization based on brightness) based on the related art and may be used to obtain the correct answer for a spot measurement.

In some example embodiments, the error caused by the device may be corrected by using a previously obtained device integer. Accordingly, a difference may decrease up to $\sigma$=about 3 to about 2%. A feature slope distribution caused by the device integer may be removed. Therefore, a result of spot measurement may be accessed. Also, the polarized microscope 1 according to some example embodiments may be efficient in managing a magnetization characteristic of a magnetic film of MRAM because massive measurement is possible for a short time.

Like the magnetic domain microscope of the comparative example, a function of a magnetic domain microscope where a polarized microscope is provided as a base is not limited to a function of observing a magnetic domain Furthermore, according to some example embodiments, a hysteresis loop of an intra image field may be quantitatively evaluated.

Also, a Kerr effect measurement device and a spot meter of the comparative example may perform point measurement, but in some example embodiments, surface measurement may be performed. Also, in some example embodiments, a hysteresis loop may be quantitatively analyzed for each ROI in an intra image field. Also, a performance indicator corresponding to a final performance of an MRAM device, such as saturation magnetization $M_s$, a coercivity $H_c$, and a slope $\alpha$, may be quantitatively evaluated in a surface from a shape of the hysteresis loop. Accordingly, an evaluation score may considerably increase, and thus, yield management based on volume data may be performed.

The inventive concepts are not limited to Embodiment 1 or other disclosed example embodiments and may be appropriately modified within a range which does not depart from an object of the inventive concepts. For example, the elements of Embodiment 1 and other example embodiments may be combined.

Also, the image processor 30 may be, for example, an information processing device such as a personal computer (PC). Furthermore, the image processor 30 is not limited to a PC and may be a server, a tablet PC, or a portable terminal or may be in a cloud. The image processor 30 may include elements (not shown) (for example, a processor, a memory, a storage device, and a communication device). Also, the storage device may store a program executed by the image processor 30. Also, the processor may read a program from the storage device and may execute a corresponding program. Accordingly, the processor may implement a function of the image processor 30.

The image processor 30 may be implemented with dedicated hardware. Also, a portion or all of the image processor 30 may be implemented by a general-use or dedicated circuit and processor, or a combination thereof. The elements may be configured by a single chip, or may be configured by a plurality of chips connected to one another with a bus therebetween. A portion or all of the image processor 30 may be implemented by a combination of the circuit and the program described above. Also, the processor may use a central processing unit (CPU), a graphics processing unit (GPU), a field-programmable gate array (FPGA), and a quantum processor (a quantum computer control chip).

Also, in a case where a portion or all of the image processor 30 is implemented by a plurality of information processing devices or circuits, the plurality of information processing devices or circuits may be intensively disposed or may be distributed and disposed. For example, the information processing device or circuit may be implemented in a form where a client server system is connected with a cloud computing system with a communication network therebetween. Also, a function of the image processor 30 may be provided as software as a service (SaaS).

Also, an intra image field correction analysis program which is read by a computer and executes the intra image field correction analysis method described above may be within the scope of some example embodiments. The intra image field correction analysis program may be stored in a non-transitory computer-readable medium or a physical storage medium.

In a non-limiting example embodiment, the computer-readable medium or the physical storage medium may include random access memory (RAM), read only memory (ROM), flash memory, solid state drive (SSD), or other memory technology, CD-ROM, digital versatile disc (DVD), Blu-ray (registered trademark) disk, or other optical disc storage, and magnetic cassette, magnetic tape, magnetic disc storage or other magnetic storage device. The intra image field correction analysis program may be transmitted in a non-transitory computer-readable medium or a communication medium. In a non-limiting example embodiment, the non-transitory computer-readable medium or the communication medium may include an electrical signal, an optical signal, an acoustic signal, or other types of signals.

(Additional Description 1)

An intra image field correction analysis program may use a polarized microscope including a light source configured to generating illumination light, a polarizer configured to transmit the illumination light including rectilinear polarized light having a first orientation, wherein the illumination light is generated by the light source incident on the polarizer, an objective lens configured to irradiate the illumination light including the rectilinear polarized light onto a sample and simultaneously or contemporaneously transmit reflected light obtained through reflection of the illumination light by the sample, an analyzer configured to transmit a component of rectilinear polarized light having a second orientation in the reflected light, an image obtainer configured to obtain an image of the reflected light, a magnet configured to generate an external magnetic field applied to the sample, and an image processor configured to process the obtained image, and the intra image field correction analysis program may execute an intra image field correction analysis method in a computer, the intra image field correction analysis method including a first operation of obtaining a plurality of images by irradiating polarized illumination light onto the sample which is non-magnetic or onto the sample which includes a magnetic material and is regarded as a non-magnetic specular sample by using the sample in a state where a magnetic field is not applied thereto, while rotating an angle between the first orientation and the second orientation at a certain interval within a certain range, and calculating, from the obtained plurality of images, a device integer, including a distribution of polarization rotation angle and a distribution of square of ellipticity based on ellipticity for each ROI of an intra image field including a plurality of ROIs, a second operation of, when the angle between the first orientation and the second orientation is set to a first angle, obtaining a hysteresis loop of a brightness value of each ROI from a plurality of images obtained while irradiating the polarized illumination light onto a magnetic material portion of the sample including the magnetic material and simultaneously or contemporaneously sweeping the external magnetic field, and when the angle between the first orientation and the second orientation is set to a second angle, obtaining a hysteresis loop of a brightness value of each ROI from a plurality of images obtained while irradiating the polarized illumination light onto the magnetic material portion of the sample including the magnetic material and simultaneously or contemporaneously sweeping the external magnetic field, and a third operation of calculating a rotation angle of a Kerr rotation for each ROI, based on analysis using the device integer, the hysteresis loop corresponding to the first angle, and the hysteresis loop corresponding to the second angle.

(Additional Description 2)

In the intra image field correction analysis program described in the additional description 1, in the first operation, the analyzer may be configured to rotate the polarizer within the certain range with respect to cross Nicole disposition.

(Additional Description 3)

In the intra image field correction analysis program described in the additional description 1 or 2, in the first operation, the device integer including the distribution of polarization rotation angle and the distribution of square of ellipticity for each ROI may be calculated by using Malus law.

(Additional Description 4)

In the intra image field correction analysis program described in one of the additional descriptions 1 to 3, in the first operation, the device integer may include a distribution of brightness, and the device integer including the distribution of brightness for each ROI may be calculated.

(Additional Description 5)

In the intra image field correction analysis program described in one of the additional descriptions 1 to 4, in the second operation, a contrast, a coercivity, and a slope for each ROI may be calculated by fitting the hysteresis loop corresponding to the first angle and the hysteresis loop corresponding to the second angle to an empirical approximation function.

(Additional Description 6)

In the intra image field correction analysis program described in the additional description 5, in the third operation, the rotation angle for each ROI may be calculated based on the first angle, the second angle, a brightness contrast corresponding to the first angle, and a brightness contrast corresponding to the second angle.

While the inventive concepts has been particularly shown and described with reference to example embodiments thereof, the inventive concepts are not limited to the example embodiments, and it will be understood by those of ordinary skill in the art that various changes in form and details may be made therein without departing from the spirit and scope of the following claims.

What is claimed is:

1. A polarized microscope comprising:

a light source configured to generate illumination light;

a polarizer configured to interact with the generated illumination light to transmit rectilinear polarized light having a first orientation;

an analyzer configured to transmit a component of the rectilinear polarized light reflected by a sample, the reflected rectilinear polarized light having a second orientation;

an image obtainer configured to obtain an image of the reflected rectilinear polarized light; and an image processor configured to process the obtained image, wherein the image processor is configured to calculate a device integer, obtain a plurality of hysteresis loops for each of regions of interest (ROIs), and calculate a rotation angle of a Kerr rotation of each ROI by using the device integer and the plurality of hysteresis loops, wherein the device integer comprises at least one of a distribution of polarization rotation angle and a distribution of square of ellipticity based on ellipticity for each ROI of an intra image field including a plurality of ROIs from a plurality of images obtained by the image obtainer.

2. The polarized microscope of claim 1, wherein the device integer comprises both of the distribution of polarization rotation angle and the distribution of square of ellipticity.

3. The polarized microscope of claim 2, wherein the image processor is configured to calculate the device integer including the distribution of polarization rotation angle and the distribution of square of ellipticity for each ROI by using Malus law.

4. The polarized microscope of claim 1, wherein
the device integer further comprises a distribution of brightness, and
the image processor is configured to calculate the device integer including the distribution of brightness.

5. The polarized microscope of claim 1, further comprising an objective lens configured to irradiate the rectilinear polarized light onto the sample and simultaneously transmit the reflected rectilinear polarized light obtained through reflection of the illumination light by the sample.

6. The polarized microscope of claim 1, wherein an angle between the first orientation and the second orientation differs in at least two of the plurality of hysteresis loops.

7. The polarized microscope of claim 1, wherein the analyzer is configured to rotate the polarizer within a certain range with respect to cross Nicole disposition.

8. The polarized microscope of claim 7, wherein the certain range comprises±10 degrees.

9. A polarized microscope comprising:
a light source configured to generate illumination light;
a polarizer configured to interact with the generated illumination light to transmit rectilinear polarized light having a first orientation;
an analyzer configured to transmit a component of the rectilinear polarized light reflected by a sample, the reflected rectilinear polarized light having a second orientation;
an image obtainer configured to obtain an image of the reflected rectilinear polarized
a magnet configured to generate an external magnetic field applied to the sample; and
an image processor configured to process the obtained image,
wherein the image processor is configured to
obtain a plurality of images by irradiating the rectilinear polarized light onto the sample regarded as a non-magnetic specular sample by using the sample in a state where a magnetic field is not applied thereto, while rotating an angle between the first orientation and the second orientation at a certain interval within a certain range, and calculate, from the obtained plurality of images, a device integer, including a distribution of polarization rotation angle and a distribution of square of ellipticity based on ellipticity for each region of interest (ROI) of an intra image field including a plurality of ROIs,
in response to the angle between the first orientation and the second orientation being set to a first angle, obtain a hysteresis loop of a brightness value of each ROI, in response to the angle between the first orientation and the second orientation being set to a second angle, obtain the hysteresis loop of the brightness value of each ROI, and calculate a rotation angle of a Kerr rotation for each ROI, based on analysis using the device integer, the hysteresis loop corresponding to the first angle, and the hysteresis loop corresponding to the second angle.

10. The polarized microscope of claim 9, wherein the image processor is configured to calculate using an angle of analyzer data passing through the analyzer for each ROI of the intra image field including a plurality of RO is in a state where an external magnetic field is not applied thereto.

11. The polarized microscope of claim 9, wherein an ROI of the intra image field including a plurality of ROIs is binned in a rectangular shape or a circular shape including a plurality of pixels.

12. The polarized microscope of claim 9, wherein the first angle and the second angle have a same size and opposite signs.

13. The polarized microscope of claim 9, wherein the image processor is configured to calculate a contrast, a coercivity, and a slope for each ROI by using the hysteresis loop corresponding to the first angle and the hysteresis loop corresponding to the second angle.

14. The polarized microscope of claim 9, wherein the sample comprises a magnetization material.

15. The polarized microscope of claim 9, further comprising a beam splitter configured to irradiate the rectilinear polarized light transmitted from the polarizer onto the sample and irradiate the reflected rectilinear polarized light reflected from the sample, onto the analyzer.

16. An intra image field correction analysis method using a polarized microscope including
a light source configured to generate illumination light,
a polarizer configured to interact with the generated illumination light to transmit rectilinear polarized light having a first orientation,
an objective lens configured to irradiate the rectilinear polarized light onto a sample and simultaneously transmit reflected rectilinear polarized light obtained through reflection by the sample,
an analyzer configured to transmit a component of the reflected rectilinear polarized light having a second orientation in the reflected rectilinear polarized light,
an image obtainer configured to obtain an image of the reflected rectilinear polarized light,
a magnet configured to generate an external magnetic field applied to the sample, and
an image processor configured to process the obtained image, wherein the intra image field correction analysis method comprises:
a first operation of obtaining a plurality of images by irradiating the rectilinear polarized light onto the sample which is non-magnetic or onto the sample which includes a magnetic material and is regarded as a non-magnetic specular sample by using the sample in a state where a magnetic field is not applied thereto, while rotating an angle between the first orientation and the second orientation at a certain interval within a certain range, and calculating, from the obtained plurality of images, a device integer, including a distribution of polarization rotation angle and a distribution of square of ellipticity based on ellipticity for each region of interest (ROI) of an intra image field including a plurality of ROIs;
a second operation of, in response to the angle between the first orientation and the second orientation being set to a first angle, obtaining a hysteresis loop of a brightness value of each ROI from a plurality of images obtained while irradiating the rectilinear polarized light onto a magnetic material portion of the sample including the magnetic material and simultaneously sweeping the external magnetic field, and in response to the angle between the first orientation and the second orientation being set to a second angle, obtaining the hysteresis loop of the brightness value of each ROI from a plurality of images obtained while irradiating the rectilinear polarized light onto the magnetic material portion of the sample including the magnetic material and simultaneously sweeping the external magnetic field; and a third operation of calculating a rotation angle of a Kerr rotation for each ROI, based on analysis using the device integer, the hysteresis loop corresponding to the first angle, and the hysteresis loop corresponding to the second angle.

17. The intra image field correction analysis method of claim 16, wherein, in the second operation, the image processor is configured to calculate a magnetic field sweeping data group for each ROI in an intra image field including a plurality of ROIs.

18. The intra image field correction analysis method of claim 16, wherein, in the second operation, the image processor is configured to calculate a contrast, a coercivity, and a slope for each ROI by fitting the hysteresis loop corresponding to the first angle and the hysteresis loop corresponding to the second angle to an empirical approximation function.

19. The intra image field correction analysis method of claim 18, wherein, in the second operation, a degree to which the external magnetic field is swept is 10 or more times a magnitude of the coercivity.

20. The intra image field correction analysis method of claim 16, wherein the sample comprises a magnetic thin film used in magnetoresistive random access memory (MRAM).

* * * * *